United States Patent
Sadek et al.

(10) Patent No.: US 10,356,623 B2
(45) Date of Patent: Jul. 16, 2019

(54) TECHNIQUES FOR PERFORMING CARRIER SENSE ADAPTIVE TRANSMISSION IN UNLICENSED SPECTRUM

(71) Applicant: QUALCOMM Incorporated, San Diego, CA (US)

(72) Inventors: Ahmed Kamel Sadek, San Diego, CA (US); Mohammad Naghshvar, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 14/486,114

(22) Filed: Sep. 15, 2014

(65) Prior Publication Data
US 2015/0085683 A1  Mar. 26, 2015

Related U.S. Application Data

(60) Provisional application No. 61/881,837, filed on Sep. 24, 2013, provisional application No. 61/981,608, filed on Apr. 18, 2014.

(51) Int. Cl.
*H04W 16/14* (2009.01)
*H04L 12/26* (2006.01)
*H04W 72/12* (2009.01)

(52) U.S. Cl.
CPC ......... *H04W 16/14* (2013.01); *H04L 43/0894* (2013.01); *H04W 72/1215* (2013.01)

(58) Field of Classification Search
CPC ........... H04L 43/0894; H04L 27/2614; H04W 16/14; H04W 72/1215; H04W 24/02; H04W 72/082
See application file for complete search history.

(56) References Cited

U.S. PATENT DOCUMENTS

| | | | |
|---|---|---|---|
| 8,509,802 B2 | 8/2013 | Li et al. | |
| 9,173,121 B2 | 10/2015 | Ji et al. | |
| 9,750,014 B2 | 8/2017 | Sadek et al. | |
| 2002/0061031 A1* | 5/2002 | Sugar | H04W 16/14 370/466 |

(Continued)

FOREIGN PATENT DOCUMENTS

| | | |
|---|---|---|
| CN | 1653838 A | 8/2005 |
| CN | 101047995 A | 10/2007 |

(Continued)

OTHER PUBLICATIONS

Wikipedia entry for "Estimation", Aug. 15, 2013, retrieved from web.archive.org/web/20130815221500/http://en.wikipedia.org/wiki/Estimation_theory, whole document.*

(Continued)

*Primary Examiner* — Un C Cho
*Assistant Examiner* — Jose L Perez
(74) *Attorney, Agent, or Firm* — Arent Fox, LLP and Qualcomm, Incorporated

(57) ABSTRACT

Aspects for reducing interference between networks are provided. A signal transmitted by a first network over a communications medium using an unlicensed frequency spectrum is decoded to determine one or more parameters of a packet in the signal. A level of utilization of the communications medium by the first network can be estimated based at least in part on a signal strength of the signal and the one or more parameters. A time for communicating in a second network over the communications medium using the unlicensed frequency spectrum can be adjusted based at least in part on the level of utilization of the communications medium by the first network.

30 Claims, 13 Drawing Sheets

(56) References Cited

U.S. PATENT DOCUMENTS

| | | | |
|---|---|---|---|
| 2003/0181211 A1* | 9/2003 | Razavilar | H04W 16/10 455/450 |
| 2008/0056201 A1* | 3/2008 | Bennett | H04W 28/18 370/334 |
| 2009/0129332 A1 | 5/2009 | Dayal et al. | |
| 2009/0285169 A1* | 11/2009 | Yang | H04W 52/143 370/329 |
| 2010/0172254 A1 | 7/2010 | Sachs | |
| 2011/0128895 A1 | 6/2011 | Sadek et al. | |
| 2011/0294508 A1 | 12/2011 | Min et al. | |
| 2012/0069766 A1 | 3/2012 | Fu et al. | |
| 2012/0082140 A1 | 4/2012 | Lin et al. | |
| 2012/0093009 A1 | 4/2012 | Wang et al. | |
| 2012/0094681 A1 | 4/2012 | Freda et al. | |
| 2012/0170557 A1 | 7/2012 | Tsfati et al. | |
| 2012/0188907 A1 | 7/2012 | Dayal et al. | |
| 2012/0243498 A1 | 9/2012 | Kwon et al. | |
| 2012/0250631 A1 | 10/2012 | Hakola et al. | |
| 2012/0264468 A1 | 10/2012 | Turtinen et al. | |
| 2012/0307744 A1 | 12/2012 | Charbit et al. | |
| 2013/0003591 A1* | 1/2013 | Novak | H04W 72/085 370/252 |
| 2013/0010766 A1 | 1/2013 | Sadek et al. | |
| 2013/0034018 A1 | 2/2013 | Wei | |
| 2013/0058245 A1 | 3/2013 | Lieshout et al. | |
| 2013/0083661 A1 | 4/2013 | Gupta et al. | |
| 2013/0094467 A1 | 4/2013 | Kwon et al. | |
| 2013/0142059 A1 | 6/2013 | Di Girolamo et al. | |
| 2013/0178225 A1 | 7/2013 | Xing | |
| 2013/0194981 A1 | 8/2013 | Wang et al. | |
| 2013/0208587 A1 | 8/2013 | Bala et al. | |
| 2013/0235814 A1 | 9/2013 | Wietfeldt et al. | |
| 2013/0242924 A1 | 9/2013 | Kim et al. | |
| 2013/0272260 A1 | 10/2013 | Bitran et al. | |
| 2014/0036818 A1 | 2/2014 | Koskela et al. | |
| 2014/0044000 A1 | 2/2014 | Charbit et al. | |
| 2014/0044105 A1 | 2/2014 | Bontu et al. | |
| 2014/0045494 A1 | 2/2014 | Pekonen et al. | |
| 2014/0050146 A1 | 2/2014 | Chrisikos et al. | |
| 2014/0050170 A1 | 2/2014 | Xu et al. | |
| 2014/0087748 A1 | 3/2014 | Hong et al. | |
| 2014/0112155 A1 | 4/2014 | Lindoff et al. | |
| 2014/0126403 A1* | 5/2014 | Siomina | H04W 24/10 370/252 |
| 2014/0301351 A1* | 10/2014 | Gao | H04W 74/08 370/329 |
| 2015/0055621 A1 | 2/2015 | Koskinen et al. | |
| 2015/0063245 A1 | 3/2015 | Gao et al. | |
| 2015/0085684 A1 | 3/2015 | Sadek | |
| 2015/0085792 A1 | 3/2015 | Reddy et al. | |
| 2015/0085841 A1 | 3/2015 | Sadek | |
| 2015/0163794 A1 | 6/2015 | Liang et al. | |
| 2015/0163801 A1 | 6/2015 | Sadek | |
| 2015/0163823 A1 | 6/2015 | Sadek et al. | |
| 2015/0208413 A1 | 7/2015 | Takano | |
| 2015/0236782 A1 | 8/2015 | Kadous et al. | |
| 2015/0296560 A1 | 10/2015 | Sadek et al. | |
| 2016/0338107 A1* | 11/2016 | Zeng | H04W 16/14 |

FOREIGN PATENT DOCUMENTS

| | | | |
|---|---|---|---|
| CN | 101808333 A | 8/2010 | |
| CN | 101600212 B | 6/2011 | |
| JP | 2009267995 A | 11/2009 | |
| JP | 2010166354 A | 7/2010 | |
| JP | 2011066895 A | 3/2011 | |
| JP | 2012034326 A | 2/2012 | |
| JP | 2012-085329 A | 4/2012 | |
| JP | 2013110673 A | 6/2013 | |
| WO | WO-2010/147956 A2 | 12/2010 | |
| WO | WO-2011/134491 A1 | 11/2011 | |
| WO | 2011150163 A1 | 12/2011 | |
| WO | 2012051303 A1 | 4/2012 | |
| WO | 2012061484 A2 | 5/2012 | |
| WO | WO-2012/061030 A1 | 5/2012 | |
| WO | WO-2012/092574 A1 | 7/2012 | |
| WO | WO-2012/093349 A2 | 7/2012 | |
| WO | WO-2012/101481 A1 | 8/2012 | |
| WO | WO-2013/006988 A1 | 1/2013 | |
| WO | WO-2013/009347 A1 | 1/2013 | |
| WO | WO-2013/019177 A1 | 2/2013 | |
| WO | WO-2013/063808 A1 | 5/2013 | |
| WO | WO-2013/071488 A1 | 5/2013 | |
| WO | 2013096563 A1 | 6/2013 | |
| WO | 2013096928 A1 | 6/2013 | |
| WO | WO-2013/086659 A1 | 6/2013 | |
| WO | 2013106745 A1 | 7/2013 | |
| WO | WO-2013/100827 A1 | 7/2013 | |
| WO | WO-2013/112983 A2 | 8/2013 | |
| WO | WO-2013112983 A2 * | 8/2013 | H04W 16/14 |
| WO | WO 2013112983 A2 * | 8/2013 | H04W 16/14 |
| WO | WO-2013/131257 A1 | 9/2013 | |
| WO | WO-2013/133928 A1 | 9/2013 | |
| WO | WO 2013131257 A1 * | 9/2013 | H04W 16/14 |

OTHER PUBLICATIONS

Intel Corporation: "Discussion on in-device coexistence scenarios and solutions", 3GPP Draft; R2-104382, 3rd Generation Partnership Project (3GPP), Mobile Competence Centre; 650, Route Des Lucioles; F-06921 Sophia-Antipolis Cedex; France, vol. RAN WG2, No. Madrid, Spain; Aug. 23, 2010, Aug. 16, 2010 (Aug. 16, 2010), XP050451684, [retrieved on Aug. 16, 2010] paragraph [02.1]—paragraph [02.2] paragraph [03.2]—paragraph [03.3].

International Search Report and Written Opinion—PCT/US2014/056616—ISA/EPO—dated Apr. 16, 2015 (13 total pages).

Ratasuk R. et al., "License-Exempt LTE Deployment in Heterogeneous Network", Wireless Communication Systems (ISWCS), 2012 International Symposium On, IEEE, Aug. 28, 2012 (Aug. 28, 2012), pp. 246-250 , XP032263759, DOI: 10.1109/ISWCS.2012.6328367, ISBN: 978-1-4673-0761-1.

ZTE: "Further analysis on in-device coexistence interference avoidance solutions", 3GPP Draft; R2-105361 Further Analysis on In-Device Coexistence Interference, 3rd Generation Partnership Project (3GPP), Mobile Competence Centre; 650, Route Des Lucioles; F-06921 Sophia-Antipolis Cedex; France, vol. RAN WG2, No. Xi'an; Oct. 11, 2010, Oct. 3, 2010 (Oct. 3, 2010), pp. 1-8, XP050452409, [retrieved on Oct. 3, 2010].

Ericsson: "DRX with Carrier Aggregation in LTE-Advanced" 3GPP Draft; R2-092959 DRX in Carrier Aggregation LTE-Advanced, SRD Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009 (Apr. 28, 2009), pp. 1-3, XP050340753.

Huawei: "Carrier aggregation in active mode", 3GPP Draft; R2-093104 Carrier Aggregation in Active Mode, 3rd Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009 (Apr. 28, 2009), 4 Pages, XP050340846, [retrieved on Apr. 28, 2009] p. 2, paragraph 2.3—p. 3.

Garcia L.G., et al., "Autonomous Component Carrier Selection for Local Area Uncoordinated Deployment of LTE Advanced", 2013 IEEE 78th Vehicular Technology Conference (VTC Fall), XP055260442, Sep. 1, 2009, pp. 1-5, ISSN: 1090-3038, DOI: 10.1109/VETECF.2009.5378826.

Casaccia L., "Considerations for LTE Enhancements and Evolution", 3GPP, RWS-120007, 3GPP, May 31, 2015, pp. 1-15, Url: http://www.3gpp.org/ftp/workshop/2012-06-11_12_RAN_REL12/Docs/RWS-120007.zip .

"Introducing LTE in Unlicensed Spectrum", 3GPP Draft; RP-131635 LTE in Unlicensed Spectrum, 3RD Generation Partnership Project (3GPP), Mobile Competence Centre ; 650, Route Des Lucioles ; F-06921 Sophia-Antipolis Cedex ; France no. Busan, South Korea; 20131203-20131207 2 Dec. 2013 (Dec. 2, 2013), XP050733706, Retrieved from the Internet: URL:http://www.3gpp.org/ftp/Meetings_3GPP_SYNC/RAN/RAN/Docs/ [retrieved on Dec. 2, 2013] the whole document.

* cited by examiner

TECHNIQUES FOR PERFORMING CARRIER SENSE ADAPTIVE TRANSMISSION IN UNLICENSED SPECTRUM

CROSS-REFERENCE TO RELATED APPLICATIONS

The present application for patent claims the benefit of U.S. Provisional Application No. 61/881,837 entitled "ADAPTING COMMUNICATION BASED ON RESOURCE UTILIZATION" filed Sep. 24, 2013, and U.S. Provisional Application No. 61/981,608 entitled "METHOD AND APPARATUS FOR PERFORMING CARRIER SENSE ADAPTIVE TRANSMISSION IN UNLICENSED SPECTRUM" filed Apr. 18, 2014, which are assigned to the assignee hereof, and expressly incorporated herein by reference in their entirety.

INTRODUCTION

Aspects of this disclosure relate generally to telecommunications, and more particularly to interference mitigation and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Third Generation Partnership Project (3GPP), 3GPP Long Term Evolution (LTE), Ultra Mobile Broadband (UMB), Evolution Data Optimized (EV-DO), Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

Over-the-air interference detection is employed in some networks in an attempt to mitigate interference caused by such encroachment. For example, a device may periodically monitor (e.g., sniff) for energy in the radio frequency (RF) band used by the device. Upon detection of any kind of energy, the device may back-off the RF band for a period of time.

In practice, however, there may be problems with such a back-off or "listen-before-talk" (LBT) approach, at least in its conventional implementation. For example, for an LTE system operating in an unlicensed band with a Wi-Fi co-channel scenario where it is desired to avoid interference from Wi-Fi, the detected energy in the band might not be from a Wi-Fi device, or might not be substantial. In addition, the detected energy in the band may simply be adjacent channel leakage. Consequently, an LTE device may back off transmissions in the band even when there is no Wi-Fi interference. In other instances, for example, coexistence between LTE and Wi-Fi in the unlicensed RF band can result in LTE performance degradation to protect Wi-Fi communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method for reducing interference between networks is provided. The method includes decoding a signal transmitted by a first network over a communications medium using an unlicensed frequency spectrum to determine one or more parameters of a packet in the signal, estimating a level of utilization of the communications medium by the first network based at least in part on a signal strength of the signal and the one or more parameters, and adjusting a time for communicating in a second network over the communications medium using the unlicensed frequency spectrum based at least in part on the level of utilization of the communications medium by the first network.

In accordance with additional aspects, an apparatus for reducing interference between networks is provided. The apparatus includes a signal decoding component configured to decode a signal transmitted by a first network over a communications medium using an unlicensed frequency spectrum, and a signal parameters evaluating component configured to determine one or more parameters of a packet in the signal. The apparatus further includes a medium utilization estimating component configured to estimate a level of utilization of the communications medium by the first network based at least in part on a signal strength of the signal and the one or more parameters, and a communication time adjusting component configured to adjust a time for communicating in a second network over the communications medium using the unlicensed frequency spectrum based at least in part on the level of utilization of the communications medium by the first network.

In accordance with further aspects, another apparatus for reducing interference between networks is provided including means for decoding a signal transmitted by a first network over a communications medium using an unlicensed frequency spectrum, and means for determining one or more parameters of a packet in the signal. The apparatus further includes means for estimating a level of utilization of the communications medium by the first network based at least in part on a signal strength of the signal and the one or more parameters, and means for adjusting a time for communicating in a second network over the communications medium using the unlicensed frequency spectrum based at least in part on the level of utilization of the communications medium by the first network.

Still in accordance with additional aspects, a non-transitory computer-readable medium storing computer executable code for reducing interference between networks is provided. The computer-readable medium includes code for decoding a signal transmitted by a first network over a communications medium using an unlicensed frequency spectrum, and code for determining one or more parameters of a packet in the signal. The computer-readable medium further includes code for estimating a level of utilization of the communications medium by the first network based at least in part on a signal strength of the signal and the one or more parameters, and code for adjusting a time for communicating in a second network over the communications medium using the unlicensed frequency spectrum based at least in part on the level of utilization of the communications medium by the first network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
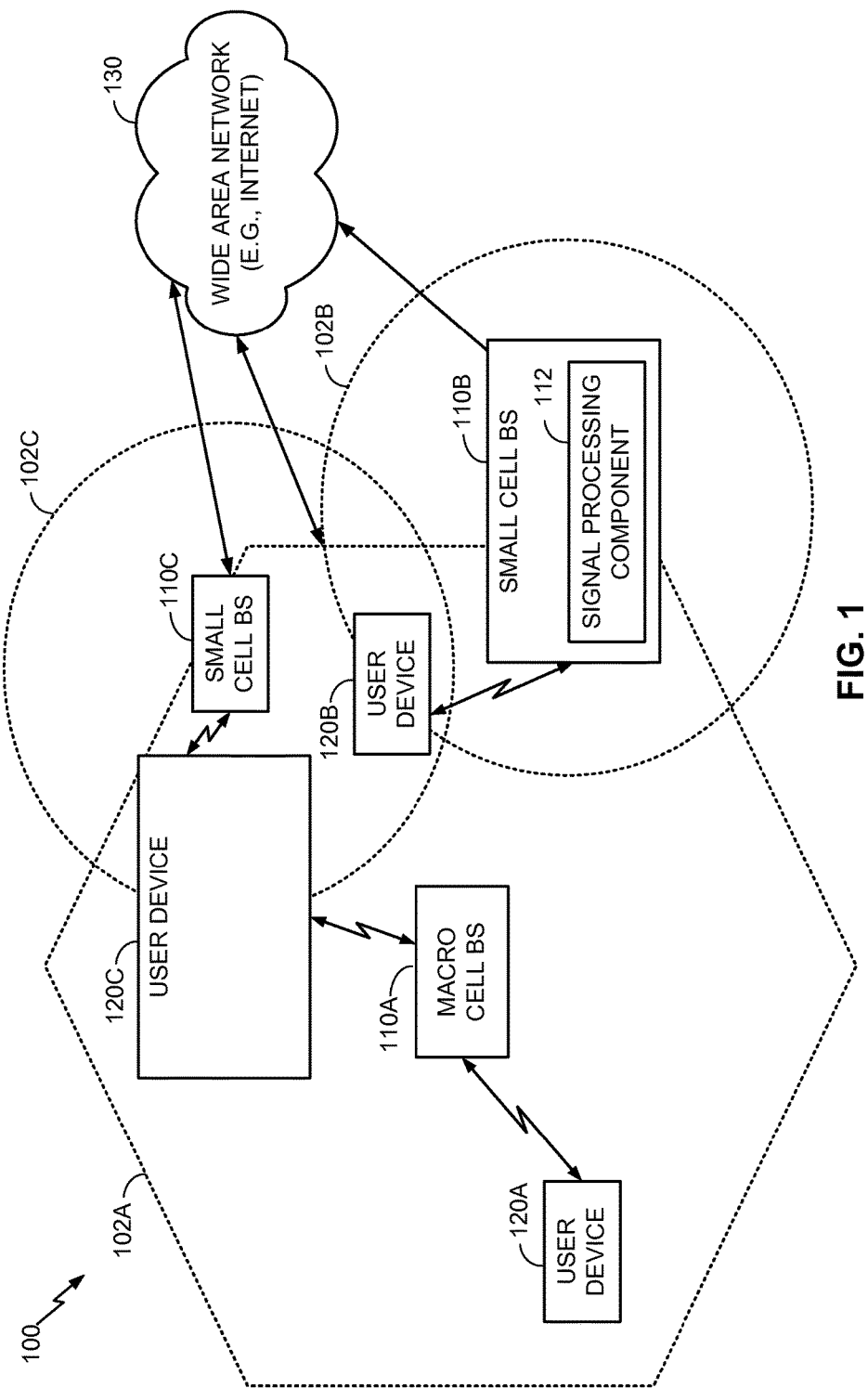
FIG. 1 illustrates an example mixed-deployment wireless communication system including macro cell base stations and small cell base stations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to performing carrier sense adaptive transmission at a network in an unlicensed spectrum by adjusting a time for utilizing certain resources for transmission based on estimating a medium utilization (MU) (e.g., a level of utilization of a communications medium) of at least a portion of the resources by one or more other networks. In particular, transmission over the resources by the network may cause interference to communication links of one or more other networks operating over a similar radio frequency (RF) band, and thus MU of the other networks over the resources can be estimated to determine a time to back-off or refrain from using the resources for transmission to mitigate interference to the one or more other networks. In an example, the MU can be estimated based at least in part on sniffing signals transmitted in the one or more other networks to determine a received signal strength of the signals and one or more parameters (e.g., packet or signal metrics, statistics). The one or more parameters can relate to parameters that can be decoded or obtained from the signal, such as a duration of the signal, a modulation and coding scheme (MCS) of the signal, a type of a packet within the signal, and/or the like.

In some cases, estimating MU based only on a received signal strength may cause back-off in cases where there is no interference (e.g., where a device or access point of the one or more other networks is not within the coverage area of the network). In an example, in estimating the MU, consideration and/or additional weighting can be given to signals from the one or more other networks having a certain strength and/or parameters that indicate the signals relate to a potentially interfered link in the one or more other networks. This can ensure that the time for back-off is increased to mitigate interference over the potentially interfered link and not necessarily where there is no potentially interfered link detected or where the detected link is not hindered by the interference.

As used herein, the term "communications medium" can include substantially any wired or wireless medium over which one or more network nodes can communicate using a radio transceiver (e.g., transmitter and/or receiver) to send, receive, and process signals from one another. For example, a "communications medium" can include a radio frequency (RF) band, RF resources over one or more time periods, etc. Moreover, an "unlicensed" frequency band or spectrum, as used herein, can refer to a portion of RF space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example mixed-deployment wireless communication system, in which small cell base stations are deployed in conjunction with and to supplement the coverage of macro cell base stations. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femto cell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The illustrated wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the medium utilization estimation and corresponding interference mitigation discussed briefly above. For example, one or more of the small cell base stations 110 may include a signal processing component 112, as described further in FIGS. 8-10.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

For illustration purposes, an example downlink and uplink frame structure for an LTE signaling scheme is described below with reference to FIGS. 2-3.

Figure 2:
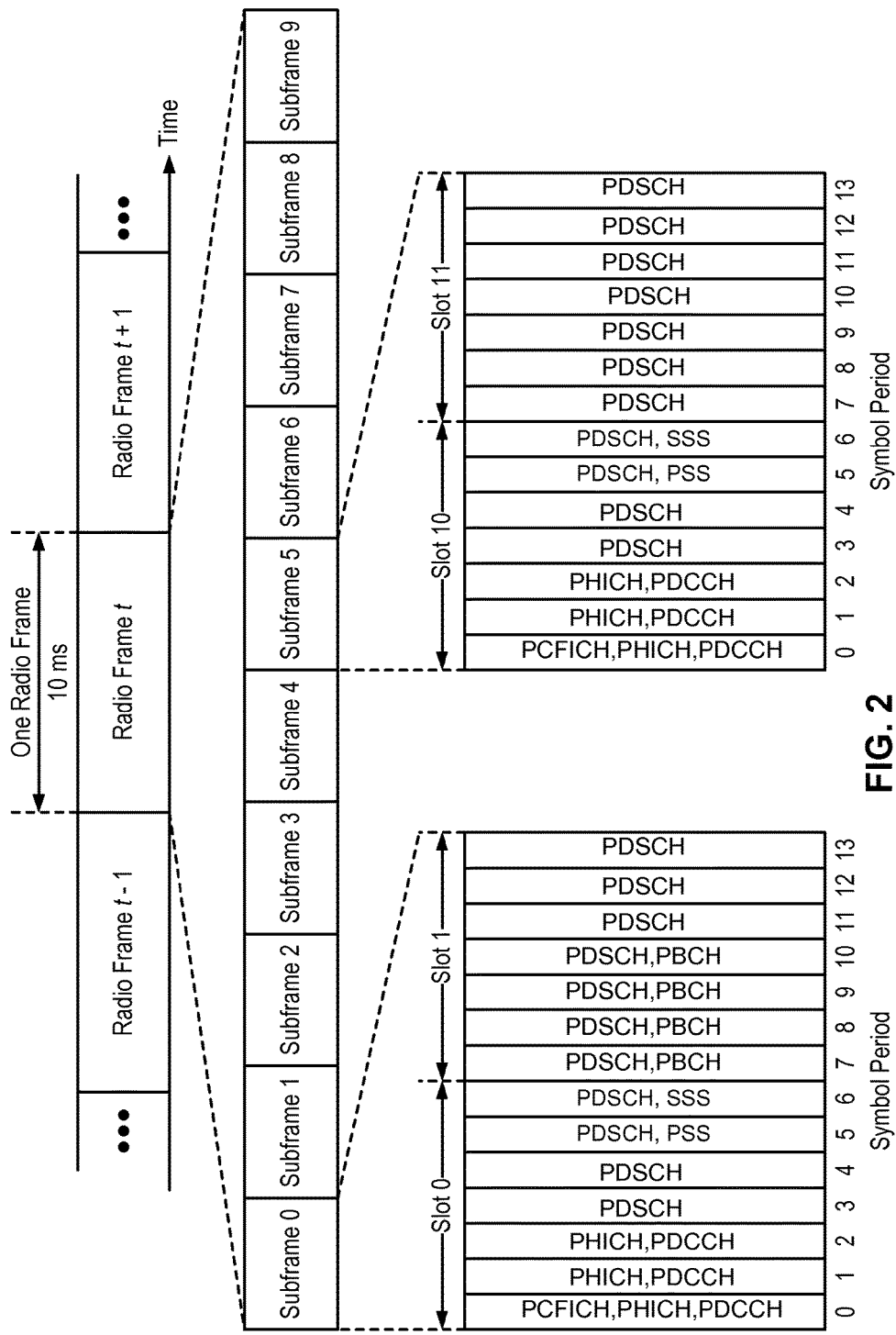
FIG. 2 is a block diagram illustrating an example downlink frame structure for LTE communications.

FIG. 2 is a block diagram illustrating an example downlink frame structure for LTE communications. In LTE, the base stations 110 of FIG. 1 are generally referred to as eNBs and the user devices 120 are generally referred to as UEs. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
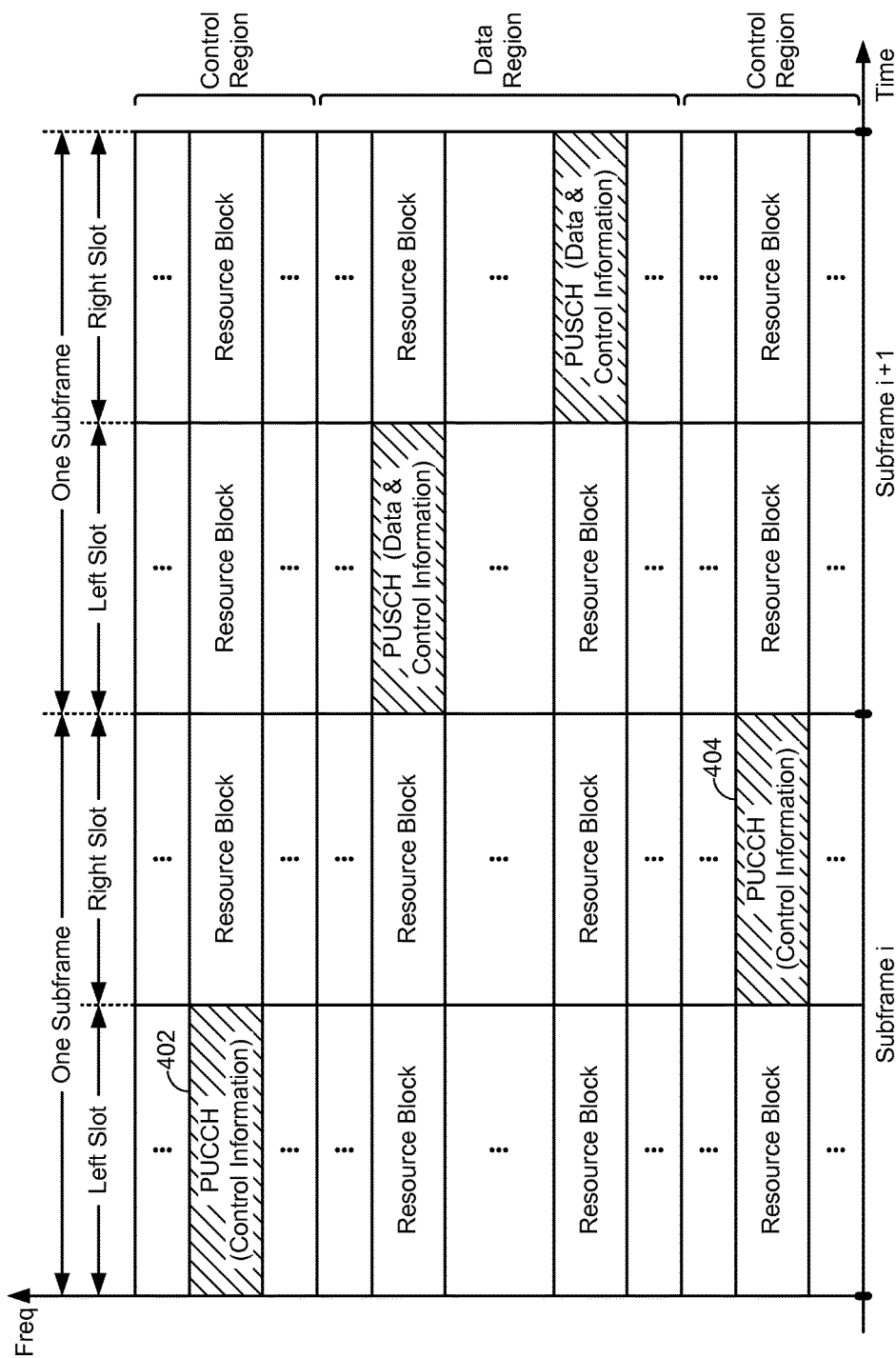
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in the LTE standard described in 3GPP TS 36.211, entitled "Evolved Universal Terrestrial Radio Access (E-UTRA); Physical Channels and Modulation," which is publicly available.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user (e.g., an anchor licensed carrier in LTE SDL or a designated one of the unlicensed carriers in LTE Standalone) and the remaining carriers serving as respective Secondary Cells (SCells). In this way, the PCell may provide a Frequency Division Duplexed (FDD) pair of downlink and uplink carriers (licensed or unlicensed), with each SCell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio co-located with its cellular radio. According to various aspects described herein, the small cell base station may leverage the co-located radio to facilitate co-existence between the different RATs when operating on a shared unlicensed band. For example, the co-located radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
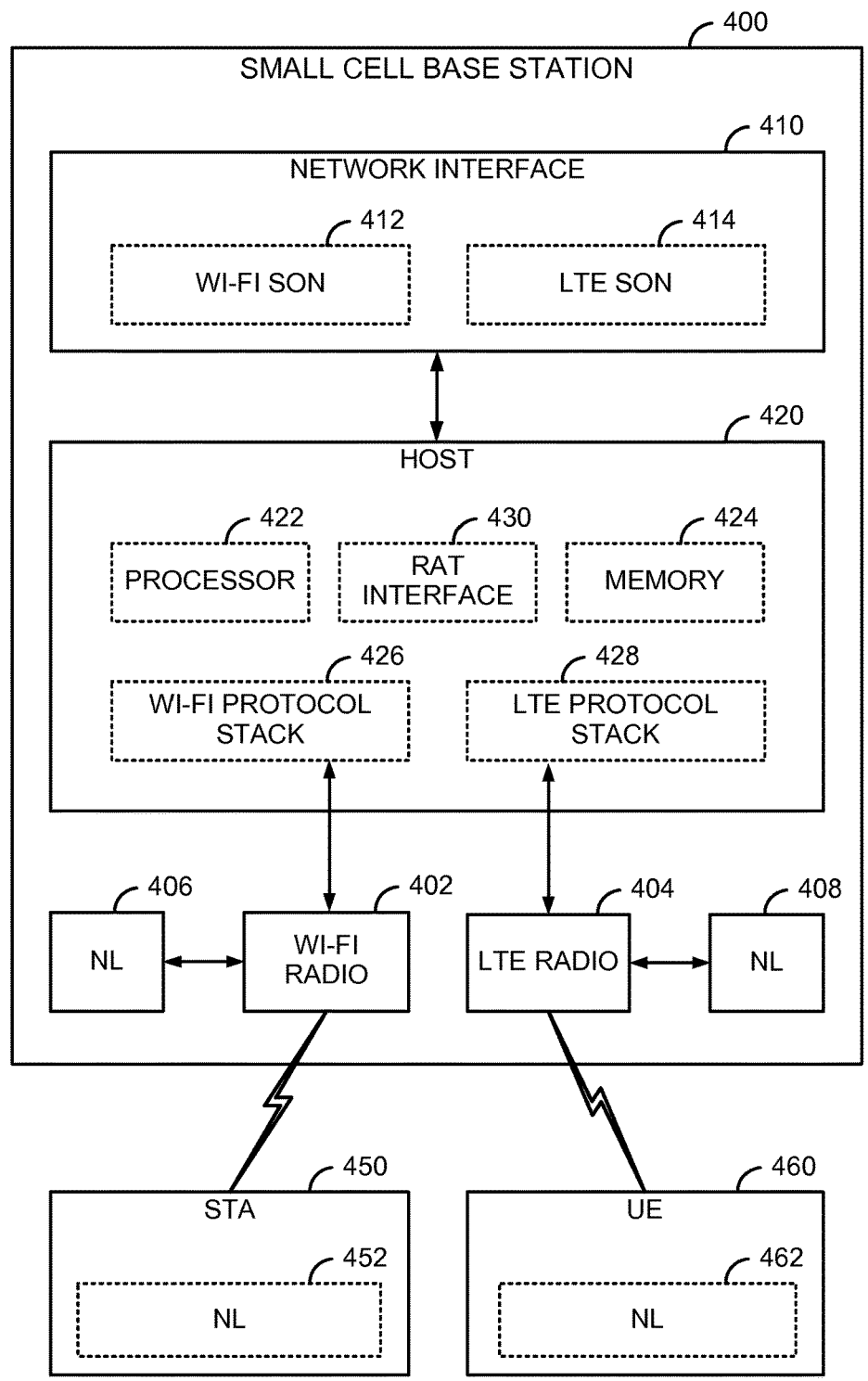
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station 400 may correspond, for example, to one of the small cell base stations 110B, 110C illustrated in FIG. 1. In this example, the small cell base station 400 is configured to provide a WLAN air interface (e.g., in accordance with an IEEE 802.11x protocol) in addition to a cellular air interface (e.g., in accordance with an LTE protocol). For illustration purposes, the small cell base station 400 is shown as including an 802.11x radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 406 and 408, respectively, or any other suitable component(s). Radios 402, 404 and/or NL modules 406 and/or 408 may include a signal processing component, as described further herein in FIGS. 8-10, to facilitate adjusting communication times over a communication medium based at least in part on estimating a level of utilization of a communication medium by other wireless technologies, as described herein.

The small cell base station 400 may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various operating channel or environment measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 400 can communicate with multiple STAs and/or UEs. Additionally, while FIG. 4 illustrates one type of user device communicating with the small cell base station 400 via the Wi-Fi radio 402 (i.e., the STA 450) and another type of user device communicating with the small cell base station 400 via the LTE radio 404 (i.e., the UE 460), it will be appreciated that a single user device (e.g., a smartphone) may be capable of communicating with the small cell base station 400 via both the Wi-Fi radio 402 and the LTE radio 404, either simultaneously or at different times.

As is further illustrated in FIG. 4, the small cell base station 400 may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 400 may also include a host 420, which may include one or more general purpose controllers or processors 422 and memory 424 configured to store related data and/or instructions. The host 420 may perform processing in accordance with the appropriate RAT(s) used for communication (e.g., via a Wi-Fi protocol stack 426 and/or an LTE protocol stack 428), as well as other functions for the small cell base station 400. In particular, the host 420 may further include a RAT interface 430 (e.g., a bus or the like) that enables the radios 402 and 404 to communicate with one another via various message exchanges.

Figure 5:
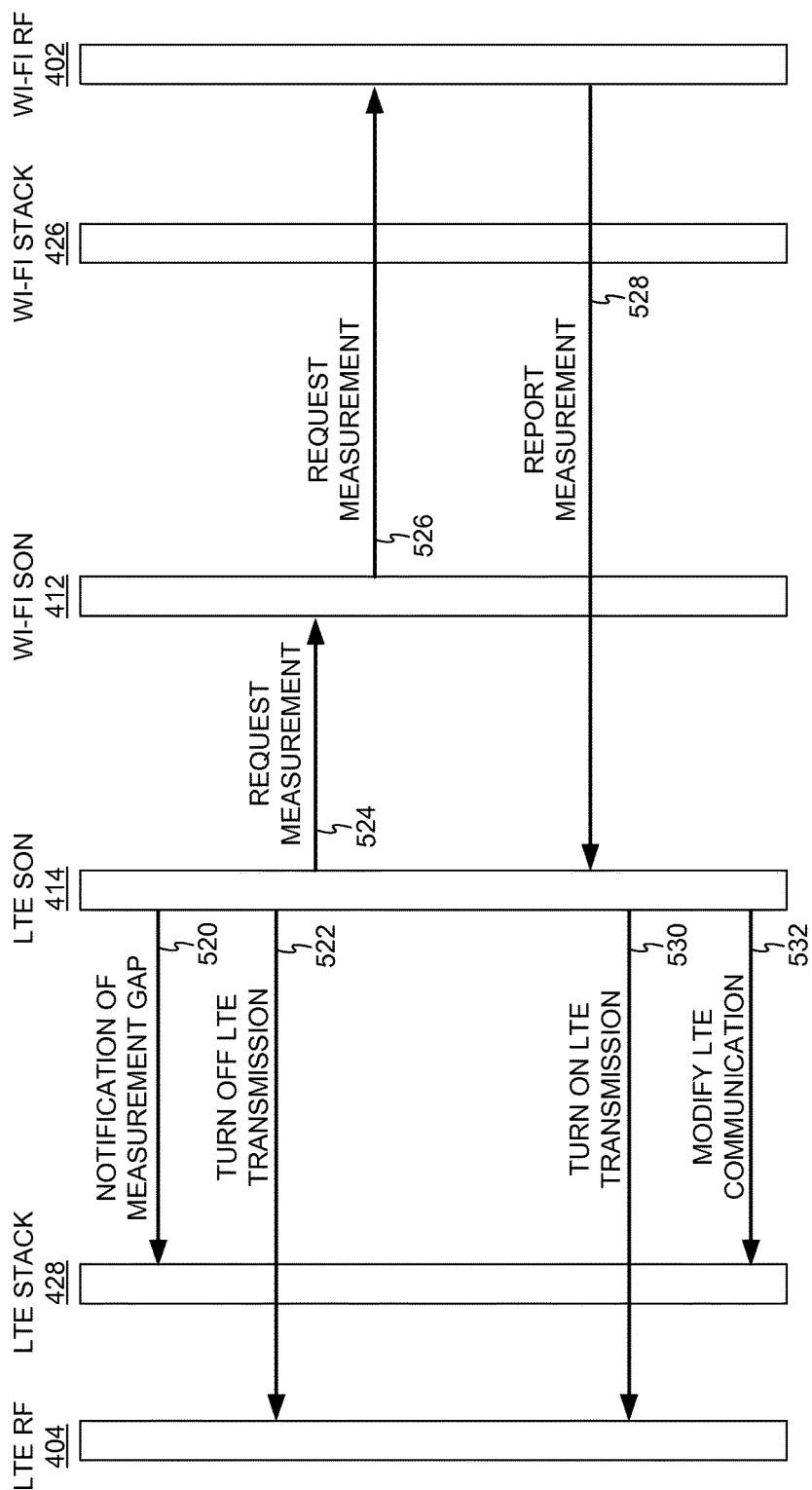
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., so as to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi stack 426 and the Wi-Fi SON 412. In some instances, the measurement report may include not only measurements performed by the Wi-Fi radio 402 itself, but also measurements collected by the Wi-Fi radio 402 from the STA 450. Further, for example, Wi-Fi radio 402 may include a signal processing component, as described herein in FIGS. 8-10, to estimate a level of utilization of the communications medium by Wi-Fi signals based on additional parameters of received signals. The LTE SON 414 may then send a command 530 to cause the LTE radio 402 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 400 may specially adapt different aspects of its cellular operations in order to manage co-existence between the different RATs. Returning to FIG. 5, the LTE SON 414, for example, may then send a message 532 that informs the LTE stack 428 how LTE communication is to be modified.

There are several aspects of cellular operation that may be adapted in order to manage co-existence between the different RATs. For example, the small cell base station 400 may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
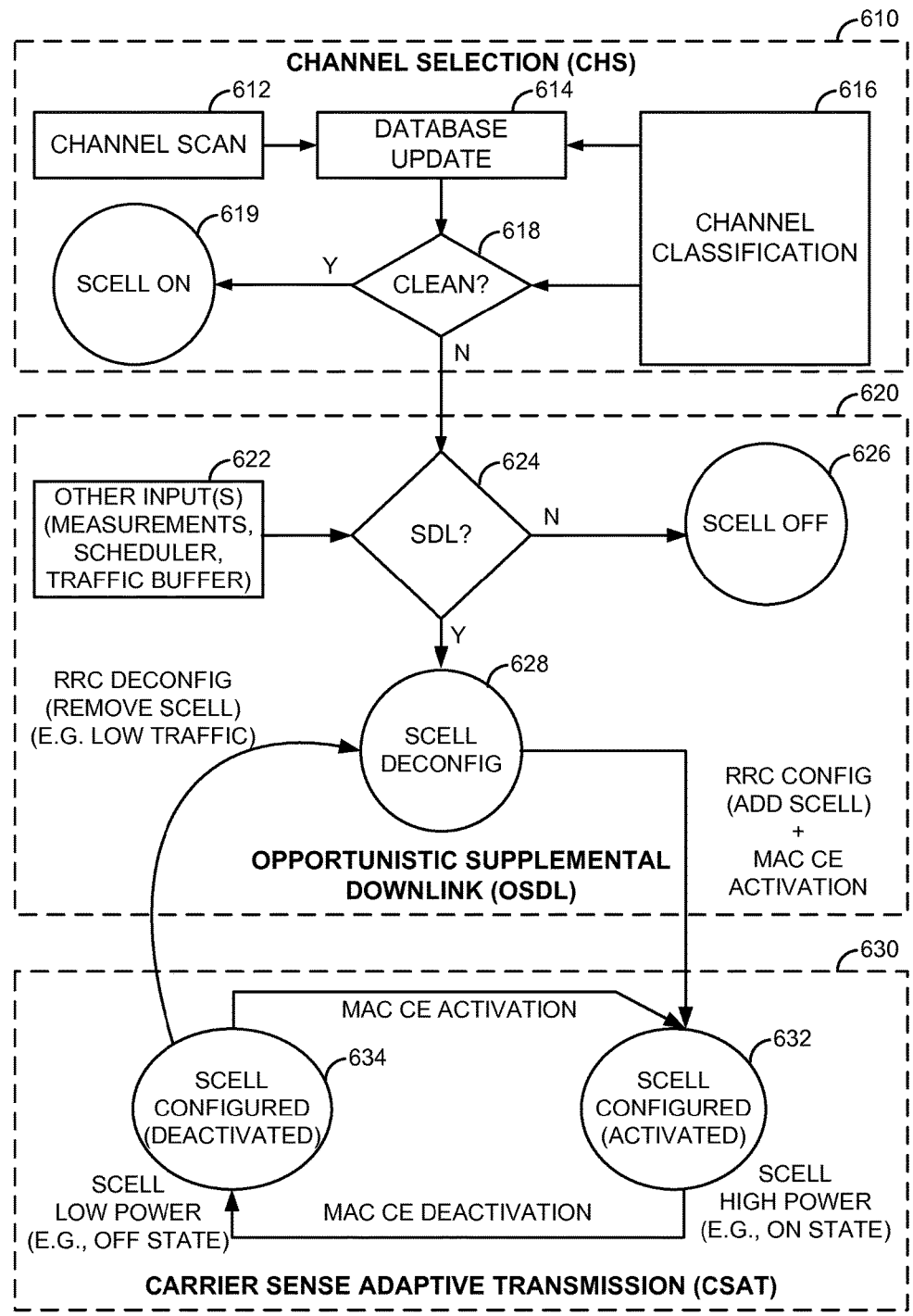
FIG. 6 is a system-level co-existence state diagram illustrating different aspects of cellular operation that may be specially adapted to manage co-existence between different RATs operating on a shared unlicensed band.

FIG. 6 is a system-level co-existence state diagram illustrating different aspects of cellular operation that may be specially adapted to manage co-existence between different RATs operating on a shared unlicensed band. As shown, the techniques in this example include operations that will be referred to herein as Channel Selection (CHS) where appropriate unlicensed carriers are analyzed, Opportunistic Supplemental Downlink (OSDL) where operation on one or more corresponding SCells is configured or deconfigured, and Carrier Sense Adaptive Transmission (CSAT) where the transmission power on those SCells is adapted, if necessary, by cycling between periods of high transmission power (e.g., an ON state, as a special case) and low transmission power (e.g., an OFF state, as a special case).

For CHS (block 610), a channel selection algorithm may perform certain periodic or event-driven scanning procedures (e.g., initial or threshold triggered) (block 612). With reference to FIG. 4, the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels in terms of their potential for cellular operation (block 616). For example, a given channel may be classified, at least in part, based on whether it is a clean channel or whether it will need to be afforded some level of protection for co-channel communications. Various cost functions and associated metrics may be employed in the classification and related calculations.

If a clean channel is identified ('yes' at decision 618), a corresponding SCell may be operated without concern for impacting co-channel communications (state 619). On the other hand, if no clean channel is identified, further processing may be utilized to reduce the impact on co-channel communications ('no' at decision 618), as described below.

Turning to OSDL (block 620), input may be received from the channel selection algorithm as well as from other sources, such as various measurements, schedulers, traffic buffers, etc. (block 622), to determine whether unlicensed operation is warranted without a clean channel being available (decision 624). For example, if there is not enough traffic to support a secondary carrier in the unlicensed band ('no' at decision 624), the corresponding SCell that supports it may be disabled (state 626). Conversely, if there is a substantial amount of traffic ('yes' at decision 624), even though a clean channel is not available, an SCell may nevertheless be constructed from one or more of the remaining carriers by invoking CSAT operation (block 630) to mitigate the potential impact on co-existence.

Returning to FIG. 6, the SCell may be initially enabled in a deconfigured state (state 628). The SCell along with one or more corresponding user devices may then be configured and activated (state 630) for normal operation. In LTE, for example, an associated UE may be configured and deconfigured via corresponding RRC Config/Deconfig messages to add the SCell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the SCell from the UE's active set, and return the system to the deconfigured state (state 628). If all UEs are deconfigured, OSDL may be invoked to turn the SCell off.

During CSAT operation (block 630), the SCell may remain configured but be cycled between periods of activated operation (state 632) and periods of deactivated operation (state 634) in accordance with a (long-term) Time Division Multiplexed (TDM) communication pattern. In the configured/activated state (state 632), the SCell may operate at relatively high power (e.g., full powered ON state). In the configured/deactivated state (state 634), the SCell may operate at a reduced, relatively low power (e.g., depowered OFF state).

Figure 7:
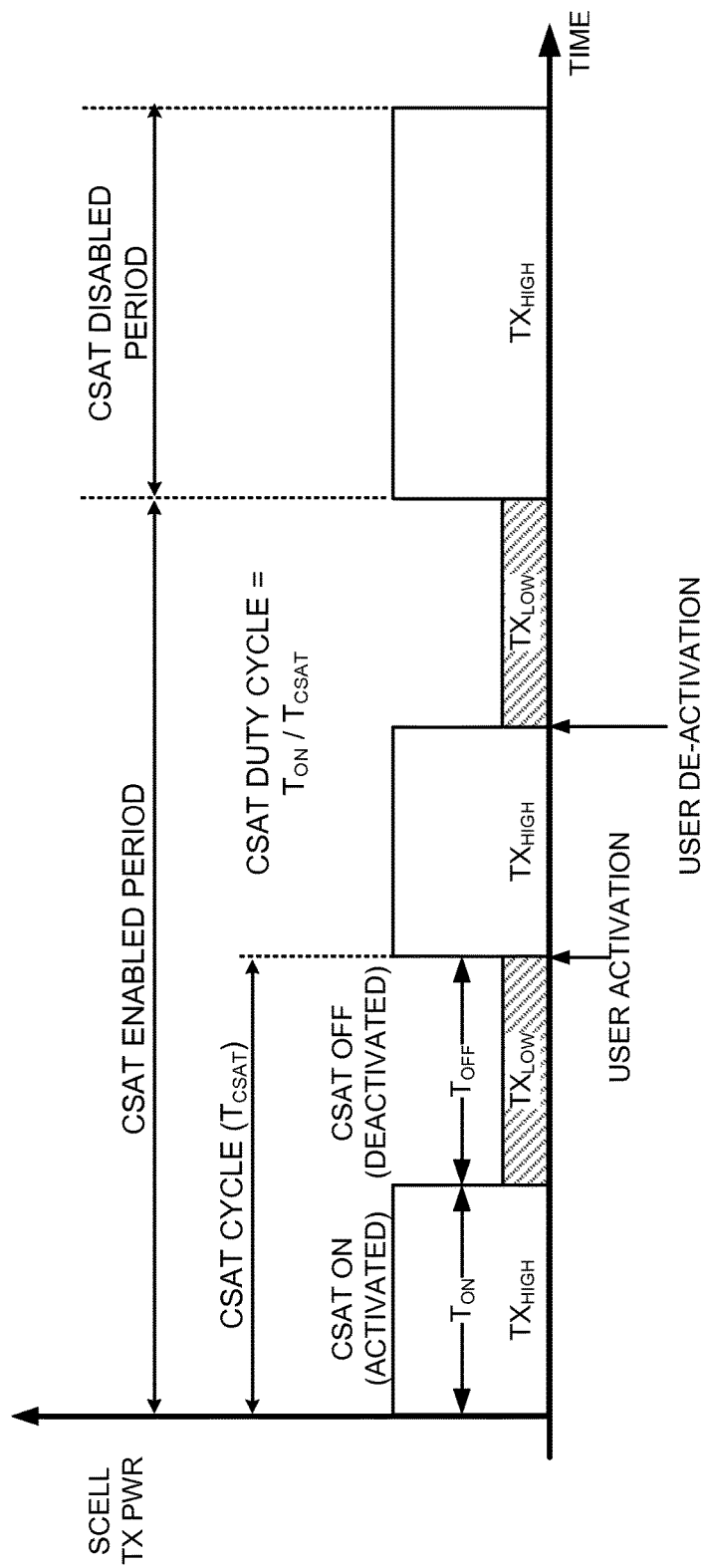
FIG. 7 illustrates in more detail certain aspects a Carrier Sense Adaptive Transmission (CSAT) communication scheme for cycling cellular operation in accordance with a long-term Time Division Multiplexed (TDM) communication pattern.

FIG. 7 illustrates in more detail certain aspects a CSAT communication scheme for cycling cellular operation in accordance with a long-term TDM communication pattern. As discussed above in relation to FIG. 6, CSAT may be selectively enabled on one or more SCells as appropriate to facilitate co-existence in unlicensed spectrum, even when a clean channel free of competing RAT operation is not available.

When enabled, SCell operation is cycled between CSAT ON (activated) periods and CSAT OFF (deactivated) periods within a given CSAT cycle ($T_{CSAT}$). One or more associated user devices may be similarly cycled between corresponding MAC activated and MAC deactivated periods. During an associated activated period of time $T_{ON}$, SCell transmission on the unlicensed band may proceed at a normal, relatively high transmission power. During an associated deactivated period of time $T_{OFF}$, however, the SCell remains in a configured state but transmission on the unlicensed band is reduced or even fully disabled to yield the medium to a competing RAT (as well as to perform various measurements via a co-located radio of the competing RAT).

Each of the associated CSAT parameters, including, for example, the CSAT pattern duty cycle (i.e., $T_{ON}/T_{CSAT}$) and the relative transmission powers during activated/deactivated periods, may be adapted based on the current signaling conditions to optimize CSAT operation. As an example, if the utilization of a given channel by Wi-Fi devices is high, an LTE radio may adjust one or more of the CSAT parameters such that usage of the channel by the LTE radio is reduced. For example, the LTE radio may reduce its transmit duty cycle or transmit power on the channel. Conversely, if utilization of a given channel by Wi-Fi devices is low, an LTE radio may adjust one or more of the CSAT parameters such that usage of the channel by the LTE radio is increased. For example, the LTE radio may increase its transmit duty cycle or transmit power on the channel. In either case, the CSAT ON (activated) periods may be made sufficiently long (e.g., greater than or equal to about 200 msec) to provide user devices with a sufficient opportunity to perform at least one measurement during each CSAT ON (activated) period.

A CSAT scheme as provided herein may offer several advantages for mixed RAT co-existence, particular in unlicensed spectrum. For example, by adapting communication based on signals associated with a first RAT (e.g., Wi-Fi), a second RAT (e.g., LTE) may react to utilization of a co-channel by devices that use the first RAT while refraining from reacting to extraneous interference by other devices (e.g., non-Wi-Fi devices) or adjacent channels. As another example, a CSAT scheme enables a device that uses one RAT to control how much protection is to be afforded to co-channel communications by devices that use another RAT by adjusting the particular parameters employed. In addition, such a scheme may be generally implemented without changes to the underlying RAT communication protocol. In an LTE system, for example, CSAT may be generally implemented without changing the LTE PHY or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, the CSAT ON (activated) period durations and transmission powers may be different, but minimum deactivation times and certain channel selection measurement gaps may be synchronized.

As described above, $T_{ON}$ for the CSAT cycle can be determined based at least in part on estimating a medium utilization (MU) by Wi-Fi over an associated set of resources (e.g., unlicensed RF band or spectrum). It is to be appreciated that $T_{OFF}$ can be determined as $T_{ON}$ subtracted from the duration of the CSAT cycle, which may be of fixed duration. In an example, $T_{ON}$ can be adapted (e.g., by an SCell, terminal, or related radio, signal processing component, etc. as described herein) based on the estimated MU according to a formula similar to the following:

$$T_{ON}(n+1)=\min(T_{ON}(n)+\Delta T_1, T_{ON,max}), \text{ if } MU<\text{Thr}_1$$

$$T_{ON}(n+1)=T_{ON}(n), \text{ if } \text{Thr}_1 \leq MU \leq \text{Thr}_2$$

$$T_{ON}(n+1)=\max(T_{ON}(n)-\Delta T_2, T_{ON,min}), \text{ if } MU>\text{Thr}_2$$

where n is a given time period (e.g., a CSAT cycle), $\Delta T_1$ is a step value for increasing $T_{ON}$ where MU is less than a first threshold ($\text{Thr}_1$), $T_{ON,max}$ is a maximum value for $T_{ON}$, which may be less than the CSAT cycle duration to allow some time for Wi-Fi communications, $\Delta T_2$ is a step value for decreasing $T_{ON}$ where MU is greater than a second threshold ($\text{Thr}_2$), and $T_{ON,min}$ is a minimum value for $T_{ON}$ to ensure some transmission time for LTE. It is to be appreciated that the step values, threshold levels, etc., can be provisioned by a network, retrieved from a configuration, tuned based on observations of network performance, etc.

In addition, in an example, an SCell, terminal, or related radio, signal processing component, etc. can estimate MU of a RAT using a formula similar to the following:

$$MU(n) = \frac{1}{T_{OFF}(n)} \sum_{i=1}^{K} W_i \times D_i$$

where K is a number of signals or related packets received in a CSAT OFF period, W is a weight calculated for a given packet (e.g., based on a received signal strength or one or more packet statistics or parameters), and D is a duration of the packet or related signal. Moreover, it is to be appreciated that MU can be periodically updated to include MU of previous CSAT cycles, which may be weighted. For example:

$$\overline{MU}(1)=MU(1)$$

$$\overline{MU}(n)=\alpha(n)MU(n-1)+\beta(n)MU(n) \text{ for } n>1$$

where $\alpha(n)$ and $\beta(n)$ can be functions of $T_{OFF}(n)$.

When an SCell, terminal, or related radio, signal processing component, etc. uses the above algorithm to compute MU, and thus $T_{ON}$ and $T_{OFF}$, Wi-Fi performance can improve due to backing-off LTE communications over a set of resources utilized for Wi-Fi communications. To ensure LTE is backed-off when a link is potentially interfered and not for all detected Wi-Fi communications over the resources, however, Wi-Fi packets or related signals can be evaluated to determine not only signal strength but also one or more other parameters of the signal in determining whether to consider the packets or related signals in computing MU for Wi-Fi. Examples of considering other additional parameters are described below. In addition, it is to be appreciated that Wi-Fi or wireless local area network (WLAN) packets can be detected based on a detected preamble, based on a detected packet structure, based on a detected long or short guard interval, etc.

Figure 8:
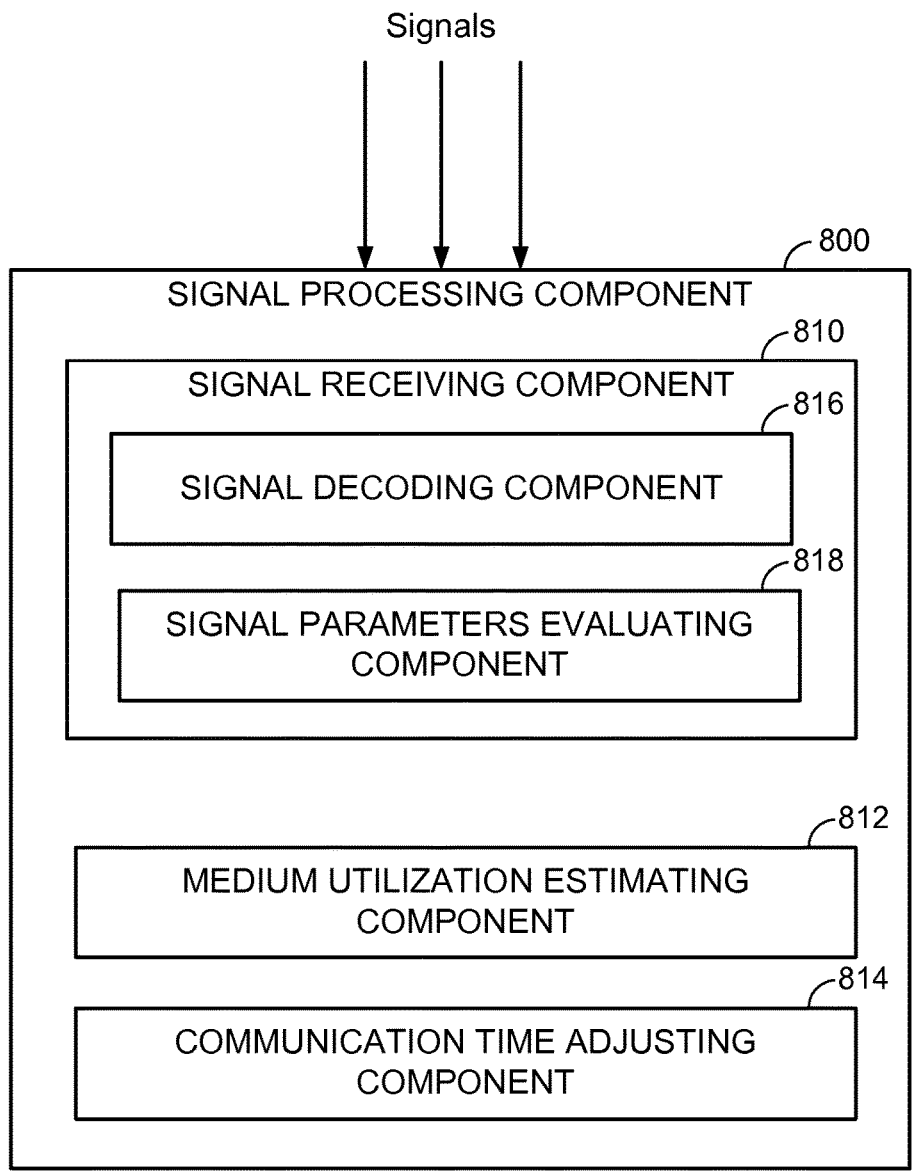
FIG. 8 is a simplified block diagram of an example signal processing component for estimating medium utilization based on signal parameters.
Figure 9:
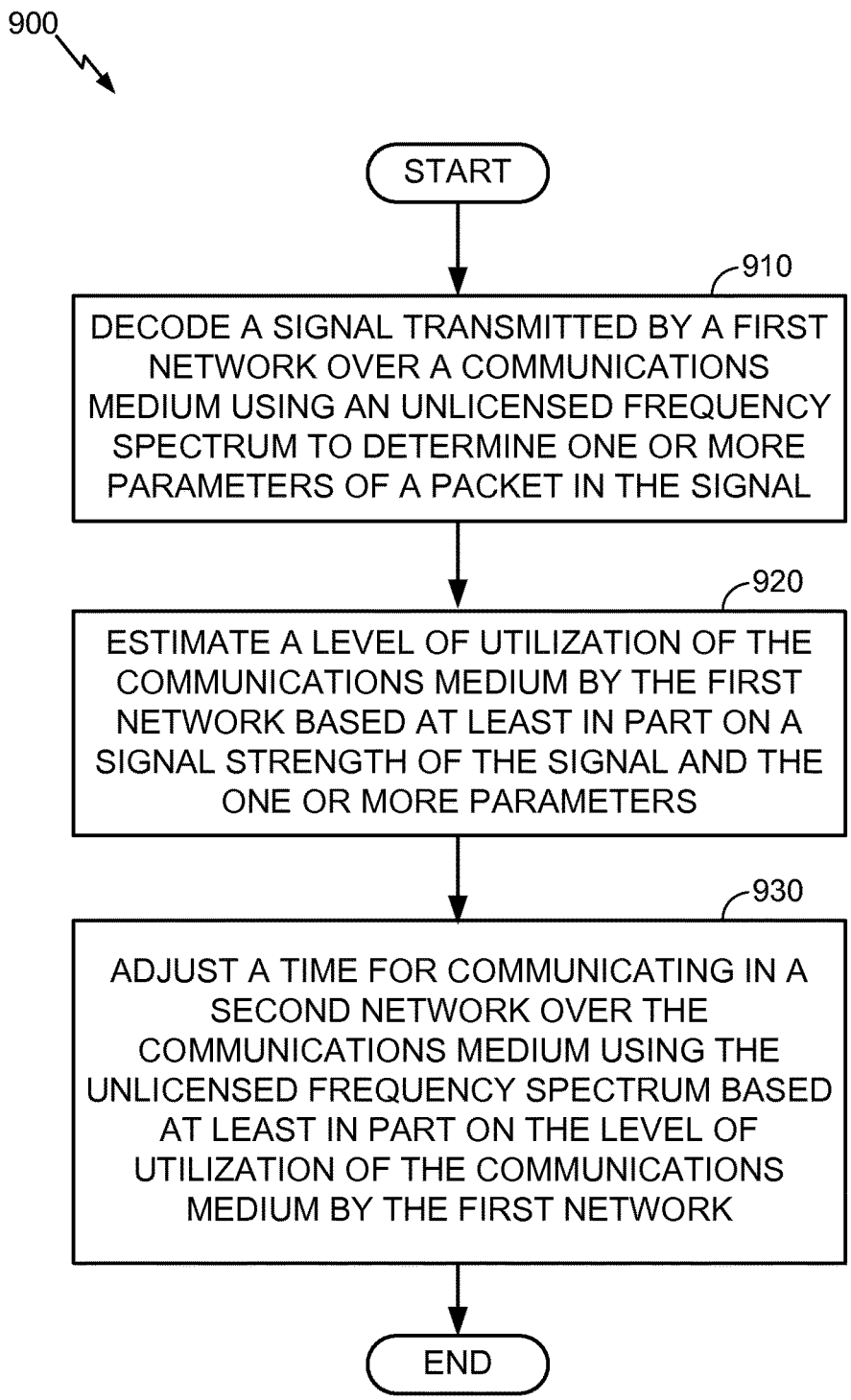
FIG. 9 is a flow diagram illustrating an example method of adjusting resource utilization based on estimating medium utilization of a first network.
Figure 10:
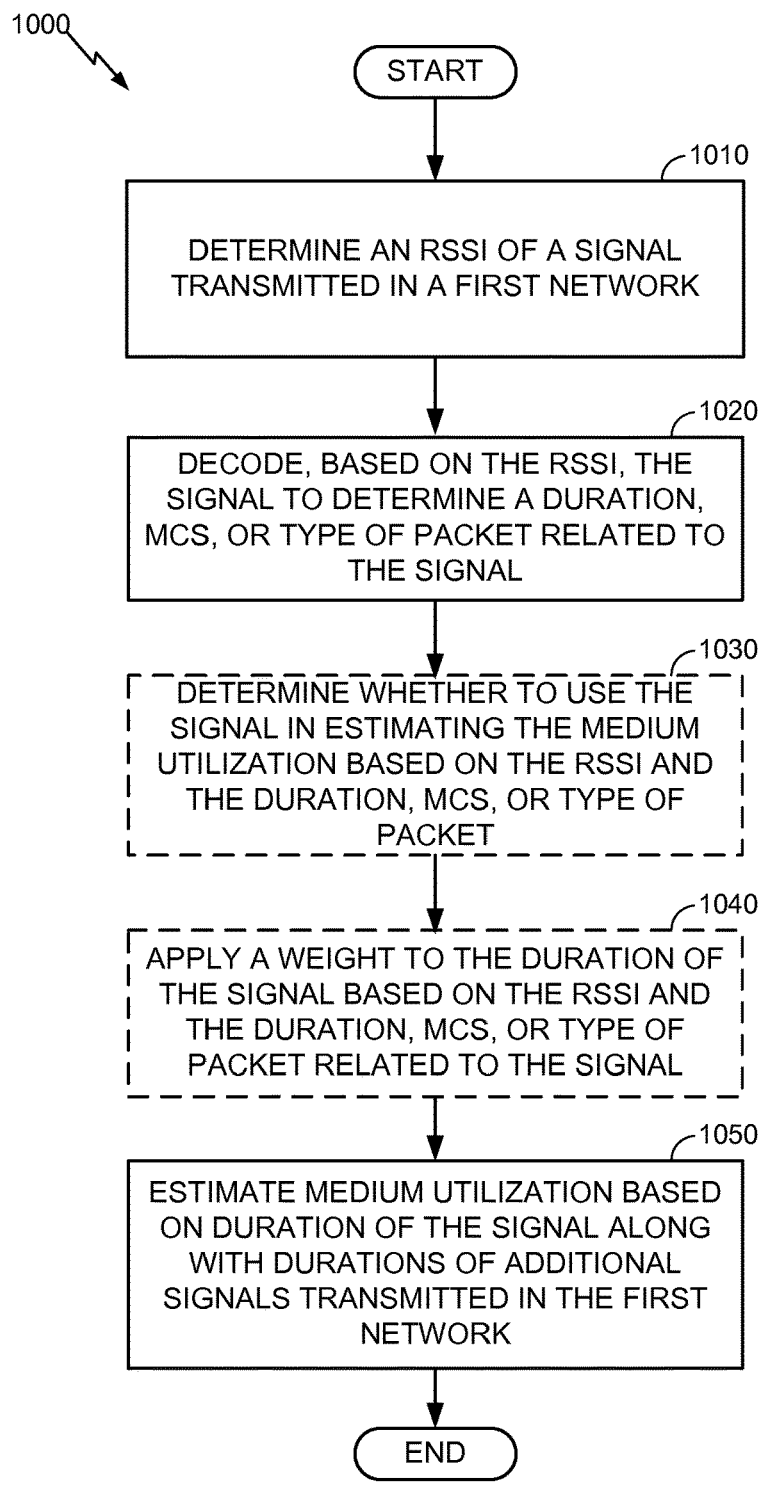
FIG. 10 is a flow diagram illustrating an example method of estimating medium utilization of a first network.

Referring to FIGS. 8-10, aspects of the present apparatus and method are depicted with reference to one or more components and one or more methods that may perform the actions or functions described herein. Although the operations described below in FIGS. 9 and 10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions. Moreover, in an aspect, a component may be one of the parts that make up a system, may be hardware or software, and/or may be divided into other components.

FIG. 8 illustrates an example signal processing component 800 including a signal receiving component 810 for receiving and detecting signals of a first RAT based on parameters thereof, a medium utilization estimating component 812 for estimating a level of utilization of a communications medium by the first RAT, and a communication time adjusting component 814 for determining a communication time for a second RAT based on the estimated level of utilization of the first RAT. For example, Wi-Fi radio 402, LTE radio 404, associated NL modules 406, 408 (FIG. 4), communication device 1114 (FIG. 11), etc., can be, can include, or can employ the signal processing component 800 for detecting signals of a different RAT and estimating a medium utilization of the different RAT for adjusting a communication time using the RAT corresponding to the given radio. As described, not all signals received over the communications medium may relate to the different RAT or otherwise may not impact communications of the RAT corresponding to the given radio. In this case, medium utilization estimating component 812 can determine whether to use the received signal (and/or determine a weight to assign to the received signals) based on determined parameters thereof to estimate a more accurate level of utilization of the communications medium. It should be noted that, in one or more aspects as used herein, the term "component" may be one of the parts that make up a system, may be hardware or software, and may be divided into other components.

FIG. 9 is a flow diagram illustrating an example method 900 of CSAT communication for enhancing CSAT to consider additional signal parameters in determining whether to use one or more signals in estimating MU of a communications medium by a first network using a first RAT (e.g., Wi-Fi). The method may be performed by an access point configured to communicate in a second network and/or using a second RAT (e.g., the small cell base stations 110B, 110C illustrated in FIG. 1, small cell base station 400 in FIG. 4, etc.) employing a signal processing component 800, for example. Moreover, it is to be appreciated that first and second networks are generally referred to herein, and may include networks that respectively operate on first and second RATs, as described above.

Method 900 includes, at Block 910, decoding a signal transmitted by a first network over a communications medium using an unlicensed frequency spectrum to determine one or more parameters of a packet in the signal. For example, signal receiving component 810 (FIG. 8) includes a signal decoding component 816 for decoding the signal, and a signal parameters evaluating component 818 for determining one or more parameters related to the signal. The one or more parameters can relate to a duration of the packet or signal, an MCS used to modulate the signal, a type of the packet or signal (e.g., data or control), and/or the like. The signal receiving component 810 can correspond to, can be included in, or can be employed by a receiver, a receiver portion of a transceiver or other radio, etc., such as a Wi-Fi radio 402, LTE radio 404, associated NL modules 406, 408 (FIG. 4), communication device 1114 (FIG. 11), etc., employed by an access point or device to receive signals of first and second networks and/or of first and second RATs (e.g., LTE and Wi-Fi). As described, signal receiving component 810 may receive the signal during a $T_{OFF}$ period or a similar period when communications over another network or RAT are backed-off. In a specific example, signal receiving component 810 may receive the signal as a Wi-Fi signal during the $T_{OFF}$ period, determined according to the formulas described with respect to FIG. 4, when communications over an LTE radio are backed-off.

Signal decoding component 816 may decode the signal at one or more layers at which signal parameters evaluating component 818 can determine the one or more parameters. For example, signal decoding component 816 may decode the packet at a physical (PHY) layer, and signal parameters evaluating component 818 can determine a duration of the signal or packet and/or an MCS of the signal based on the PHY layer decoding. In another example, signal decoding component 816 may decode the packet additionally or alternatively at a media access control (MAC) layer, and signal parameters evaluating component 818 may determine a packet type (e.g., whether the packet is a data packet or a control packet, such as a Wi-Fi acknowledgement (ACK) or similar packet) based on the MAC layer decoding.

Method 900 also includes, at Block 920, estimating a level of utilization of the communications medium (e.g., also referred to as a medium utilization (MU)) by the first network based at least in part on a signal strength of the signal and the one or more parameters. For example, signal processing component 800 includes a medium utilization estimating component 812 for estimating the level of utilization of the communications medium. In an example, signal parameters evaluating component 818 can determine the signal strength as a received signal strength indicator (RSSI) of the signal received from the first network (e.g., via the receiver of the first network) or a similar measurement of received signal power. Using the one or more parameters in conjunction with the signal strength can result in a more accurate determination of the MU of the first network. For example, some received signals may not relate to the first network or may relate to signals that may not be interfered by other communications over the communications medium. In this regard, additionally determining the one or more parameters of the decoded signal provides additional information regarding the received signal to facilitate determining whether the signal or related packet would be interfered by communications over the communications medium or its related resources (e.g., RF resources). Thus, this information is used in estimating the MU of the first network by determining whether to include the signal in estimating the MU (e.g., using the formula above) and/or in determining a weight to apply to a duration of the signal in estimating the MU, as described further herein.

Method 900 also includes, at Block 930, adjusting a time for communicating in a second network over the communications medium using the unlicensed frequency spectrum based at least in part on the level of utilization of the communications medium by the first network. Signal processing component 800 includes a communication time adjusting component 814 for adjusting the time for communicating in the second network (e.g., using a second RAT). For example, this includes adjusting a duty cycle for communicating over at least a portion of the set of resources in the second network (e.g., using a second RAT) based on determining the MU of the first network (e.g., that uses a first RAT). As described, in an example, communication time adjusting component 814 can adjust the duty cycle by increasing or decreasing the duty cycle by a step value where the MU is less than a first threshold or greater than a second threshold (e.g., using the formulas described above in reference to FIG. 4).

Additional example aspects of the actions of decoding the signal and estimating MU based on RSSI and one or more parameters in this regard will now be described additionally in reference to method 1000 of FIG. 10. For example, Blocks 910 and 920 of FIG. 9 may include one or more or a portion of the Blocks described in FIG. 10. At Block 1010, an RSSI of a signal transmitted in a first network can be determined. For example, signal receiving component 810 can receive the signal from one or more devices communicating in the first network (e.g., using a first RAT), and signal parameters evaluating component 818 can determine the RSSI of the signal. As described, a co-located receiver of a first network can be used to obtain the first network signals (e.g., an LTE AP can include a co-located Wi-Fi radio for obtaining Wi-Fi signals) during a $T_{OFF}$ or similar back-off period where transmissions are not occurring (e.g., at the LTE AP).

Method 1000 also includes, at Block 1020, decoding, based on the RSSI, the signal to determine a duration, MCS, or type of packet related to the signal. As described, signal decoding component 816 can decode the signal at a PHY, MAC, or other layer, and signal parameters evaluating component 818 can determine the duration, MCS, or type of packet related to the signal. In addition, signal decoding component 816 may decode the signal (e.g., at Block 1020) based on the RSSI, such that if the signal is over a first threshold RSSI, the signal need not be decoded, and medium utilization estimating component 812 can use the signal in estimating the MU (or not use the signal) based on the RSSI and regardless of the other signal parameters. Thus, for certain RSSI in an example, it can be assumed that communications over the resources would interfere with such signals, and these signals are used in estimating MU of the first network.

Method 1000 also optionally includes, at Block 1030, determining whether to use the signal in estimating the medium utilization based on the RSSI and the duration, MCS, or type of packet. For example, medium utilization estimating component 812 can determine whether to use the signal based on various parameters, as described, such as the RSSI and/or MCS of a packet determined to be a data packet, an RSSI of a packet determined to be a corresponding ACK packet, etc. where such values can be obtained.

Specifically, in an example, signal parameters evaluating component 818 can determine the MCS used by the data packet. Medium utilization estimating component 812 can determine an indication of downlink SNR and uplink SNR for the first network signals (e.g., the signals on the Wi-Fi link) based on the MCS, since the MCS may be selected based on the SNR (and since ACK MCS has 1:1 mapping to downlink MCS). In addition, RSSI of the received data signal (referred to herein as $RSSI_{Data}$) determined by signal parameters evaluating component 818 can allow medium utilization estimating component 812 to further estimate of pathloss to an AP of the first network (e.g., from an AP of the second network), and hence interference potentially caused to the AP of the first network on the downlink (e.g., interference by an LTE AP to a Wi-Fi AP) to receive ACK or uplink traffic. In addition, ACK or Block ACK of the uplink traffic can be received after Short Interframe Space (SIFS) duration from the data packet in Wi-Fi and can be identified by its duration. Thus, signal parameters evaluating component 818, in one example, can detect the ACK or Block ACK as a signal received after a SIFS duration relating to the received data signal, based on a duration of the signal, based on determining a source and/or destination MAC ID from a MAC header of the signal, etc. Signal parameters evaluating component 818 can accordingly estimate pathloss to a device of the first network (e.g., a Wi-Fi device) as well based on a determined RSSI of the ACK signal (referred to herein as $RSSI_{ACK}$). Medium utilization estimating component 812 can determine an indication of potential interference (e.g., by the LTE AP) to downlink traffic to the first network device. Using the determined UL/DL SNR and/or UL/DL pathloss estimations, when available, medium utilization estimating component 812 can estimate the drop of MCS in the first network due to potential interference by the AP of the second network (e.g., the LTE AP), and can accordingly determine whether to consider the signals in estimating medium utilization by the first network. For example, medium utilization estimating component 812, in this regard, may avoid considering signals that would not result in a threshold drop of MCS due to potential interference, which can provide a more accurate estimation of MU that would be impacted by potential interference from the AP of the second network.

In one example, medium utilization estimating component 812 may be configured to make conservative assumptions on the DL and UL transmit power in estimating pathloss as described above (although some Wi-Fi packets may include an indicator of the transmit power used, such as beacon in AP, in which case medium utilization estimating component 812 may determine the transmit power based on that indicated in the packet). Thus, from the estimated MCS drop and conservative assumptions regarding downlink and uplink transmit power (or the power determined from the packets), medium utilization estimating component 812 may determine whether to include this packet in MU calculation and/or a weight to apply to a duration of the packet in MU calculation. Moreover, in an example, medium utilization estimating component 812 can further determine an expected increase in Wi-Fi reuse due to transmitting over the communications medium using an LTE AP in certain durations in determining whether to include the packet in MU calculation (e.g., include the packet with the reuse is determined to be over a threshold level).

In an example, the above considerations can be simplified to medium utilization estimating component 812 determining whether RSSI of the packet is less than a threshold, whether MCS of the packet is greater than a second threshold, and whether RSSI of a corresponding ACK packet is less than a third threshold. For example, the thresholds can be configured by a network operator to the medium utilization estimating component 812 (e.g., by an operation and management (O&M) server or similar network entity). For example, the network operator may determine the thresholds to achieve a desired trade-off between LTE performance and Wi-Fi protection. Based on these determinations, medium utilization estimating component 812 can determine whether to use the corresponding Wi-Fi packets in calculating MU and/or a weight to apply to a duration of the packets in calculating MU, as described further below.

In a specific example, signal parameters evaluating component 818 can determine if the type of packet is a data packet. If so, medium utilization estimating component 812 can determine if the RSSI of the data packet ($RSSI_{Data}$) is less than the first threshold RSSI (RSSI_Thr), and whether a function of the RSSI of the data packet, an RSSI of a corresponding ACK packet ($RSSI_{ACK}$), and the MCS (also referred to as $f(RSSI_{Data}, RSSI_{ACK}, MCS_{DL})$ herein) is greater than a second threshold ($\gamma$). If so, medium utilization estimating component 812 can utilize the signal (e.g., or a duration thereof) in estimating MU, depending on which of the foregoing values can be obtained from the signal and/or additional signals.

In one example, $f(RSSI_{Data}, RSSI_{ACK}, MCS_{DL})$ can include a function of the SNR and the signal-to-interference ratio (SIR) for the signals (e.g., $f(RSSI_{Data}, RSSI_{ACK}, MCS_{DL})=SNR_{DL}/SIR_{DL}$). In this example, $SNR_{DL}$ can be the SNR of a Wi-Fi device measured during $T_{OFF}$. As described, for example, medium utilization estimating component 812 can estimate the DL SNR based on $MCS_{DL}$ of the received signal, such as by using $MCS_{DL}$ link curves. $SIR_{DL}$ can be the SIR at the Wi-Fi device where interference is caused during $T_{ON}$ (e.g., by the LTE AP). As described, medium utilization estimating component 812 can estimate the signal level for the $SIR_{DL}$ using $SNR_{DL}$ and a conservative assumption regarding noise level. One example conservative assumption can be based on a 9 dB noise figure and a 20 MHz bandwidth (e.g., −92 dBm computed as −174+ 10*log 10 (20×10$^6$)+9). Medium utilization estimating component 812 can estimate the interference level caused to the Wi-Fi device (e.g., by the LTE AP) using $RSSI_{ACK}$. This can include signal parameters evaluating component 818 detecting a subsequently received ACK signal based on a determined signal type, a duration between the data signal and the ACK signal (e.g., SIFS duration), a source/destination MAC ID in the MAC header, etc., as described, and medium utilization estimating component 812 can utilize the RSSI of the signal as an indication of pathloss (e.g., to the LTE AP).

Additionally or alternatively, in this example, $f(RSSI_{Data}, RSSI_{ACK}, MCS_{DL})$ as determined by medium utilization estimating component 812 can include a function of the SNR and the signal-to-interference- and noise ratio (SINR) for the signals (e.g., $f(RSSI_{Data}, RSSI_{ACK}, MCS_{DL})=SNR_{DL}/SINR_{DL}$). In this example, $SNR_{DL}$ can be the SNR of a Wi-Fi device measured (e.g., estimated using $MCS_{DL}$ link curves) during $T_{OFF}$, as described. Medium utilization estimating component 812 can determine the $SINR_{DL}$ at the Wi-Fi device where interference is caused during $T_{ON}$ (e.g., by the LTE AP) and includes noise from the Wi-Fi device.

Thus, for example, $SNR_{DL}/SINR_{DL}$ can be the ratio of physical rate during $T_{OFF}$ and $T_{ON}$. Another function of the $SNR_{DL}$ and $SINR_{DL}$ in this regard may include $SNR_{DL}/(\alpha SINR_{DL}+(1-a)SNR_{DL})$, where $\alpha$ is a fixed parameter (e.g., open loop) or selected adaptively (e.g., closed loop), such as $\alpha(t)=T_{ON}(t)/(T_{ON}(t)+T_{OFF}(t))$.

Moreover, in this example, in addition or alternatively to the computations above, medium utilization estimating component 812 can determine $f(RSSI_{Data}, RSSI_{ACK}, MCS_{DL})$ as equal to $RSSI_{ACK}$. For example, this computation can be selected where $MCS_{DL}$ cannot be determined from the packet (e.g., cannot be decoded from the PHY layer of the signal).

In certain configurations, signal parameters evaluating component 818 may not be able to detect an ACK for the received signal (e.g., the type of packet is determined to be data and no corresponding ACK has been received). This may occur, for example, where the Wi-Fi device to which the data signal is sent by the Wi-Fi AP is outside of a cell provided by the LTE AP that utilizes the signal processing component 800 (thus the LTE AP receives signals from the Wi-Fi AP but not from the Wi-Fi device). This may also occur, for example, where another Wi-Fi device or the LTE AP cell causes interference to the Wi-Fi device transmitting ACK signals to the Wi-Fi AP. In such cases, for example, medium utilization estimating component 812 can determine whether to use the signal in estimating the medium utilization based on determining whether the $SNR_{DL}$ is additionally less than a SNR threshold. For example, medium utilization estimating component 812 can compute the SNR threshold assuming for $RSSI_{ACK}$, N+4, where N is a noise power in decibel-milliwatts (dBm), and 4 dB corresponds to the minimum SNR level to decode a signal header (e.g., SIG header in 802.11a/n/ac, such as L-SIG, HT-SIG, VHT-SIG-A, etc.). In this regard, for example, medium utilization estimating component 812 can compute the SNR threshold as $(4+Tx_{SC}-Tx_{STA})/(1-1/\gamma)$, where $Tx_{SC}$ is a transmit power of the LTE AP in dBm, $Tx_{STA}$ is a conservative assumption on the Wi-Fi device transmit power in dBm (e.g., 15 dBm).

In other certain configurations, signal parameters evaluating component 818 may not be able to detect data signals corresponding to received ACK packets. This may occur, for example, where the Wi-Fi AP to which the ACK is sent by the Wi-Fi device is outside of a cell provided by the LTE AP that utilizes the signal processing component 800 (thus the LTE AP receives signals from the Wi-Fi device but not the Wi-Fi AP). This may also occur, for example, where another Wi-Fi AP or the LTE AP cell causes interference to the Wi-Fi AP transmitting data signals to the Wi-Fi device. In such cases, for example, where signal parameters evaluating component 818 determines the type of packet as an ACK packet but no corresponding data signal is detected, medium utilization estimating component 812 can determine whether to use the signal in estimating the medium utilization based on determining whether the $RSSI_{ACK}$>the first threshold RSSI (RSSI_Thr) for data packets, as described above. In addition, in this regard, medium utilization estimating component 812 may also extend the duration of the signal to be the size of a data packet for the purposes of estimating MU, in one example, since an ACK packet is much shorter, though receiving the ACK may indicate similar interference to the actual data packet.

In addition, for example, medium utilization estimating component 812 can determine whether to use the signal in estimating the medium utilization based on the RSSI and the duration, MCS, or type of packet (e.g., at Block 1030) by determining to use the signal with a certain probability based on comparing the RSSI and the duration, MCS, type of packet, or function thereof, to multiple thresholds. Thus, for example, medium utilization estimating component 812 can determine to use the signal in estimating MU using a first probability $p_{high}$ where $RSSI_{Data} \geq RSSI\_Thr_{high}$, using a second probability $p_{med}$ where $RSSI\_Thr_{med} \leq RSSI_{Data} < RSSI\_Thr_{high}$, using a third probability $p_{low}$ where $RSSI\_Thr_{low} \leq RSSI_{Data} < RSSI\_Thr_{med}$, etc.

Method 1000 optionally includes, at Block 1040, applying a weight to the duration of the signal based on the RSSI and the duration, MCS, or type of packet related to the signal. Thus, for example, in addition or alternatively to determining whether to use the signal in estimating the MU, medium utilization estimating component 812 can apply a weight to the signal in estimating the MU. The weight can be applied using similar calculations as those described above for determining whether to use the signal in estimating the MU. In addition, the weight can be different based on different values for RSSI, $f(RSSI_{Data}, RSSI_{ACK}, MCS_{DL})$, etc. In one example, bins can be used to divide the packets according to different weights, where each bin has a condition related to RSSI, $f(RSSI_{Data}, RSSI_{ACK}, MCS_{DL})$, etc., and a corresponding weight.

For example, if medium utilization estimating component 812 determines a signal has $RSSI_{Data} \geq RSSI\_Thr_1$, and $f_1(RSSI_{Data}, RSSI_{ACK}, MCS_{DL}) > \gamma_1$, medium utilization estimating component 812 can apply a first weight W1 to the duration of the signal, where $RSSI\_Thr_1$ is a first threshold RSSI and $\gamma_1$ is a first function threshold. Where medium utilization estimating component 812 determines the signal has $RSSI\_Thr_2 \leq RSSI_{Data} < RSSI\_Thr_1$ and $f_2(RSSI_{Data}, RSSI_{ACK}, MCS_{DL}) > \gamma_2$, medium utilization estimating component 812 can apply a second weight W2 to the duration of the signal, where $RSSI\_Thr_2$ is a second RSSI threshold less than $RSSI\_Thr_1$, and $\gamma_2$ is a second function threshold less than $\gamma_1$. This can continue for varying levels of RSSI and function thresholds to $RSSI\_Thr_n \leq RSSI_{Data} < RSSI\_Thr_{n-1}$, and $f_n(RSSI_{Data}, RSSI_{ACK}, MCS_{DL}) > \gamma_n$, a nth weight Wn is applied to the duration of the signal, where $RSSI\_Thr_n$ is a nth threshold RSSI less than $RSSI\_Thr_{n-1}$, which is a (n−1)th threshold less than $RSSI\_Thr_2$, and $\gamma_n$ is a nth function threshold RSSI less than $\gamma_2$. In one example, bins can be used to classify packets according to the relationship between RSSI and $f_1(RSSI_{Data}, RSSI_{ACK}, MCS_{DL})$ and one or more thresholds, and each bin can have a corresponding weight. It is to be appreciated that $f_n(RSSI_{Data}, RSSI_{ACK}, MCS_{DL})$ can be one of the functions described above.

Method 1000 also include, at Block 1050, estimating medium utilization based on duration of the signal along with durations of additional signals transmitted in the first network. Thus, for example, medium utilization estimating component 812 can estimate MU based on the durations as weighted in Block 1040 or otherwise and/or additionally based on whether the signals are determined to be used at Block 1030. For example, medium utilization estimating component 812 may estimate the MU using the following formula (described above with respect to FIG. 4):

$$MU(n) = \frac{1}{T_{OFF}(n)} \sum_{i=1}^{K} W_i \times D_i$$

where W is the weight applied at 1040 to the duration, D, of the signal.

Figure 11:
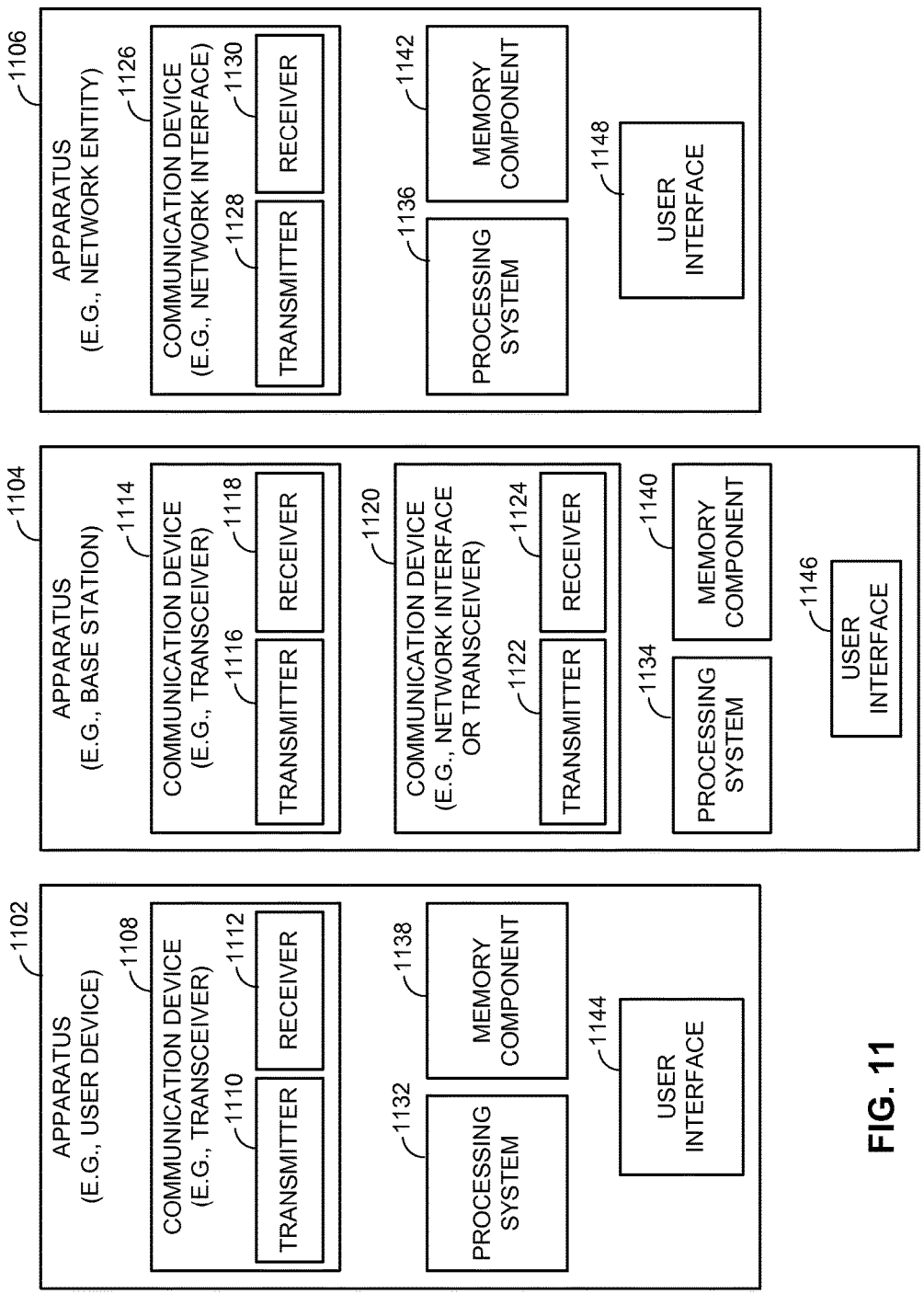
FIG. 11 is a simplified block diagram of several sample aspects of components that may be employed in communication nodes and configured to support communication as taught herein.

FIG. 11 illustrates several sample components (represented by corresponding blocks) that may be incorporated into an apparatus 1102, an apparatus 1104, and an apparatus 1106 (corresponding to, for example, a user device, a base station, and a network entity, respectively) to support the medium utilization estimation and corresponding interference mitigation operations as taught herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1102 and the apparatus 1104 each include at least one wireless communication device (represented by the communication devices 1108 and 1114 (and the communication device 1120 if the apparatus 1104 is a relay)) for communicating with other nodes via at least one designated RAT. Each communication device 1108 includes at least one transmitter (represented by the transmitter 1110) for transmitting and encoding signals (e.g., messages, indications, information, and so on) and at least one receiver (represented by the receiver 1112) for receiving and decoding signals (e.g., messages, indications, information, pilots, and so on). Similarly, each communication device 1114 includes at least one transmitter (represented by the transmitter 1116) for transmitting signals (e.g., messages, indications, information, pilots, and so on) and at least one receiver (represented by the receiver 1118) for receiving signals (e.g., messages, indications, information, and so on). If the apparatus 1104 is a relay station, each communication device 1120 may include at least one transmitter (represented by the transmitter 1122) for transmitting signals (e.g., messages, indications, information, pilots, and so on) and at least one receiver (represented by the receiver 1124) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1104 may also comprise a Network Listen Module (NLM) or the like for performing various measurements.

The apparatus 1106 (and the apparatus 1104 if it is not a relay station) includes at least one communication device (represented by the communication device 1126 and, optionally, 1120) for communicating with other nodes. For example, the communication device 1126 may comprise a network interface that is configured to communicate with one or more network entities via a wire-based or wireless backhaul. In some aspects, the communication device 1126 may be implemented as a transceiver configured to support wire-based or wireless signal communication. This communication may involve, for example, sending and receiving: messages, parameters, or other types of information. Accordingly, in the example of FIG. 11, the communication device 1126 is shown as comprising a transmitter 1128 and a receiver 1130. Similarly, if the apparatus 1104 is not a relay station, the communication device 1120 may comprise a network interface that is configured to communicate with one or more network entities via a wire-based or wireless backhaul. As with the communication device 1126, the communication device 1120 is shown as comprising a transmitter 1122 and a receiver 1124.

The apparatuses 1102, 1104, and 1106 also include other components that may be used in conjunction with the medium utilization estimation and corresponding interference mitigation operations as taught herein. The apparatus 1102 includes a processing system 1132 for providing functionality relating to aspects taught herein and for providing other processing functionality. The apparatus 1104 includes a processing system 1134 for providing functionality relating to aspects taught herein such as, for example, estimating a level of utilization of a communications medium by a network, accordingly adjusting a time for communicating in another network, etc., as taught herein and for providing other processing functionality. The apparatus 1106 includes a processing system 1136 for providing functionality relating to aspects taught herein and for providing other processing functionality. The apparatuses 1102, 1104, and 1106 include memory components 1138, 1140, and 1142 (e.g., each including a memory device), respectively, for maintaining information (e.g., information indicative of reserved resources, thresholds, parameters, and so on). In addition, the apparatuses 1102, 1104, and 1106 include user interface devices 1144, 1146, and 1148, respectively, for providing indications (e.g., audible and/or visual indications) to a user and/or for receiving user input (e.g., upon user actuation of a sensing device such a keypad, a touch screen, a microphone, and so on).

For convenience, the apparatuses 1102, 1104, and/or 1106 are shown in FIG. 11 as including various components that may be configured according to the various examples described herein. It will be appreciated, however, that the illustrated blocks may have different functionality in different designs.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1108, 1132, 1138, and 1144 may be implemented by processor and memory component(s) of the apparatus 1102 (e.g., by execution of appropriate code and/or by appropriate configuration of processor components). Similarly, some or all of the functionality represented by blocks 1114, 1120, 1134, 1140, and 1146 may be implemented by processor and memory component(s) of the apparatus 1104 (e.g., by execution of appropriate code and/or by appropriate configuration of processor components). Also, some or all of the functionality represented by blocks 1126, 1136, 1142, and 1148 may be implemented by processor and memory component(s) of the apparatus 1106 (e.g., by execution of appropriate code and/or by appropriate configuration of processor components).

Figure 12:
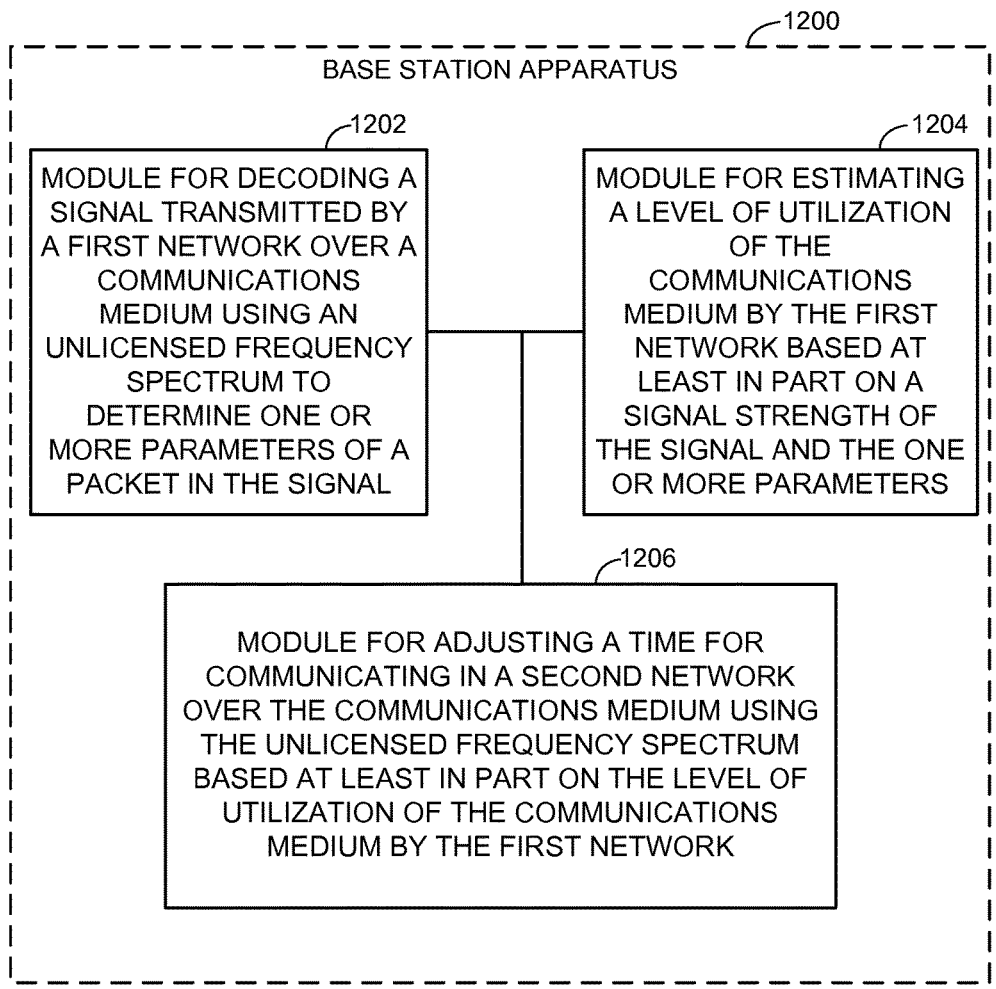
FIG. 12 is another simplified block diagram of sample aspects of an apparatus configured to support communication as taught herein.

FIG. 12 illustrates an example base station apparatus 1200 represented as a series of interrelated functional modules. A module for decoding a signal transmitted by a first network over a communications medium using an unlicensed frequency spectrum to determine one or more parameters of a packet in the signal 1202 may correspond at least in some aspects to, for example, a signal decoding component, a signal receiving component, a signal processing component, a transceiver, etc. as discussed herein. A module for estimating a level of utilization of the communications medium by the first network based at least in part on a signal strength of the signal and the one or more parameters 1204 may correspond at least in some aspects to, for example, a medium utilization estimating component, a processing system, etc. as discussed herein. A module for adjusting a time for communicating in a second network over the communications medium using the unlicensed frequency spectrum based at least in part on the level of utilization of the communications medium by the first network 1206 may correspond at least in some aspects to, for example, a communication time adjusting component, a processing system, etc. as discussed herein. The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Figure 13:
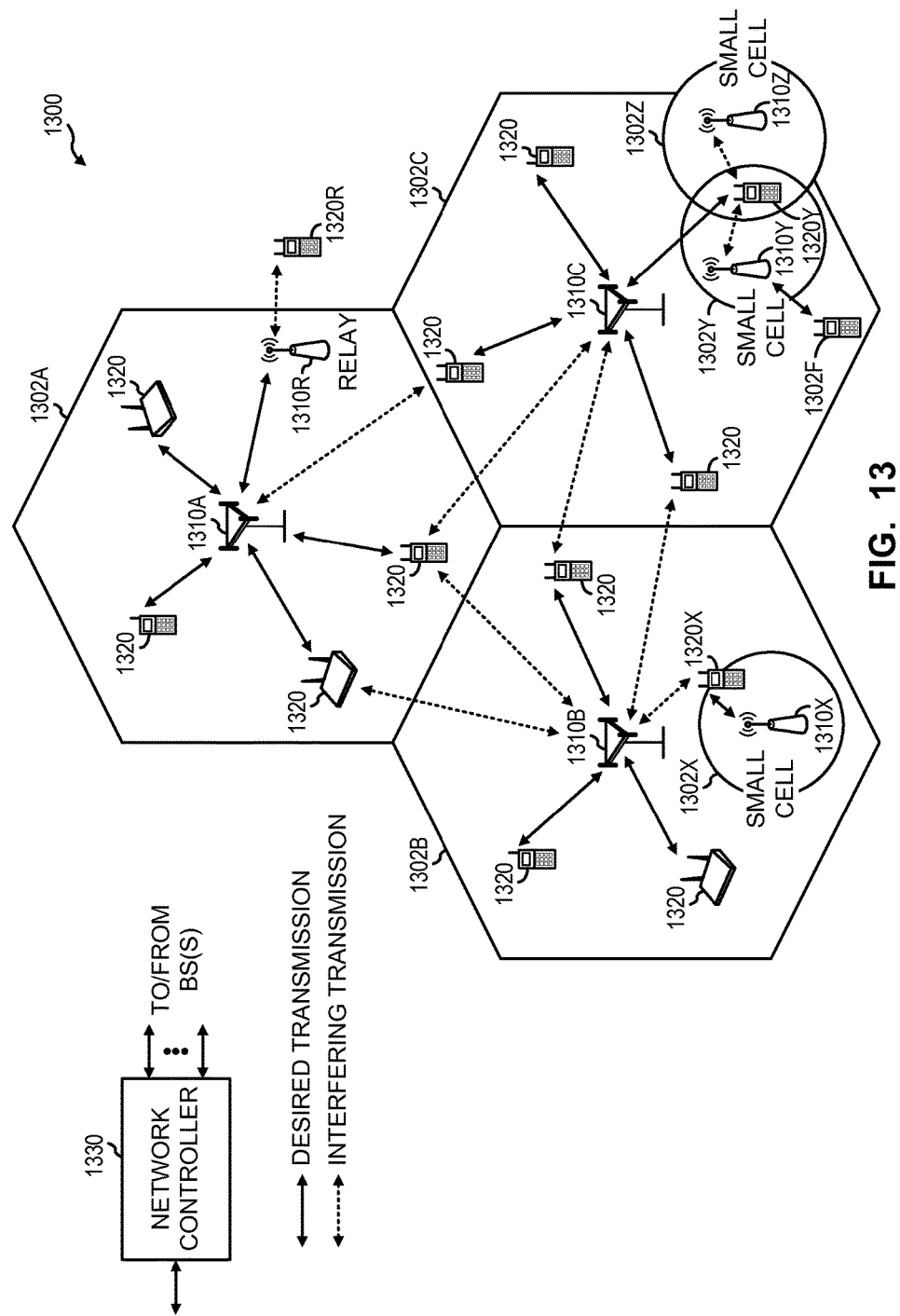
FIG. 13 illustrates an example communication system environment in which the teachings and structures herein may be may be incorporated.

FIG. 13 illustrates an example communication system environment in which the medium utilization estimation and corresponding interference mitigation teachings and structures herein may be may be incorporated. The wireless communication system 1300, which will be described at least in part as an LTE network for illustration purposes, includes a number of eNBs 1310 and other network entities. Each of the eNBs 1310 provides communication coverage for a particular geographic area, such as macro cell or small cell coverage areas.

In the illustrated example, the eNBs 1310A, 1310B, and 1310C are macro cell eNBs for the macro cells 1302A, 1302B, and 1302C, respectively. The macro cells 1302A, 1302B, and 1302C may cover a relatively large geographic area (e.g., several kilometers in radius) and may allow unrestricted access by UEs with service subscription. The eNB 1310X is a particular small cell eNB for the small cell 1302X. The small cell 1302X may cover a relatively small geographic area and may allow unrestricted access by UEs with service subscription. The eNBs 1310Y and 1310Z are particular small cell eNBs for cells 1302Y and 1302Z, respectively. The small cells 1302Y and 1302Z may cover a relatively small geographic area (e.g., a home) and may allow unrestricted access by UEs (e.g., when operated in an open access mode) or restricted access by UEs having association with the small cell (e.g., UEs in a Closed Subscriber Group (CSG), UEs for users in the home, etc.), as discussed in more detail below.

The wireless network 1300 also includes a relay station 1310R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 13, the relay station 1310R communicates with the eNB 1310A and a UE 1320R in order to facilitate communication between the eNB 1310A and the UE 1320R. A relay station may also be referred to as a relay eNB, a relay, etc.

The wireless network 1300 is a heterogeneous network in that it includes eNBs of different types, including macro eNBs, small cell eNBs (such as pico eNBs, femto eNBs, relays, and/or the like), etc. As discussed in more detail above, these different types of eNBs may have different transmit power levels, different coverage areas, and different impacts on interference in the wireless network 1300. For example, macro eNBs may have a relatively high transmit power level whereas small cell eNBs may have a lower transmit power level (e.g., by a relative margin, such as a 10 dBm difference or more).

Returning to FIG. 13, the wireless network 1300 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1330 may couple to a set of eNBs and provide coordination and control for these eNBs. The network controller 1330 may communicate with the eNBs 1310 via a backhaul. The eNBs 1310 may also communicate with one another, e.g., directly or indirectly via a wireless or wireline backhaul.

As shown, the UEs 1320 may be dispersed throughout the wireless network 1300, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 13, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1320Y may be in proximity to small cell eNBs 1310Y, 1310Z. Uplink transmissions from UE 1320Y may interfere with small cell eNBs 1310Y, 1310Z. Uplink transmissions from UE 1320Y may jam small cell eNBs 1310Y, 1310Z and degrade the quality of reception of other uplink signals to small cell eNBs 1310Y, 1310Z.

Small cell eNBs such as the small cell eNB 1310X and small cell eNBs 1310Y, 1310Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs)

belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, small cell eNB 1310Y may be an open-access small cell eNB with no restricted associations to UEs. The small cell eNB 1310Z may be a higher transmission power eNB initially deployed to provide coverage to an area. Small cell eNB 1310Z may be deployed to cover a large service area. Meanwhile, small cell eNB 1310Y may be a lower transmission power eNB deployed later than small cell eNB 1310Z to provide coverage for a hotspot area (e.g., a sports arena or stadium) for loading traffic from either or both eNB 1310C, eNB 1310Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the process or (e.g., cache memory).

Accordingly, it will also be appreciated, for example, that certain aspects of the disclosure can include a computer-readable medium embodying a method for medium utilization estimation and corresponding interference mitigation, as described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for reducing interference between networks, comprising:
    decoding a first signal transmitted by a first network over a communications medium using an unlicensed frequency spectrum to determine one or more parameters of a data packet in the signal;
    decoding a second signal transmitted by the first network over the communications medium;
    determining that the second signal includes an acknowledgement packet associated with the data packet;
    determining a signal-to-noise ratio (SNR) associated with a first signal strength of the first signal;
    determining, based on determining that the second signal includes the acknowledgement packet associated with the data packet, a signal-to-interference ratio (SIR) as a function of at least a second signal strength of the second signal;
    utilizing, based on determining that the second signal includes the acknowledgement packet associated with the data packet and where a function including both of the SNR and the SIR achieves a threshold, a duration of the first signal in computing a level of utilization of the communications medium by the first network; and
    adjusting a time for communicating in a second network over the communications medium using the unlicensed frequency spectrum based at least in part on the level of utilization of the communications medium by the first network; and
    communicating, based on the time as adjusted, in the second network by transmitting over the communications medium using the unlicensed frequency spectrum.

2. The method of claim 1, wherein decoding the signal is based at least in part on determining the first signal strength of the first signal is at least at a threshold level.

3. The method of claim 1, wherein the one or more parameters include one or more of the duration of the first signal, a modulation and coding scheme (MCS) of the first signal, or a type of the data packet.

4. The method of claim 3, wherein determining the SNR is based at least in part on the MCS of the first signal, and wherein determining the SIR is further based at least in part on both of the first signal strength of the first signal and a transmit power for communicating in the second network.

5. The method of claim 3, wherein determining the SNR is based at least in part on the MCS of the first signal, and wherein determining the SIR is further based at least in part on all of the first signal strength of the first signal, a noise power related to the first signal, and a transmit power for communicating in the second network.

6. The method of claim 3, wherein utilizing the duration of the first signal in computing the level of utilization of the communications medium is further based on comparing the second signal strength to a threshold.

7. The method of claim 3, wherein determining the SNR is based at least in part on the MCS of the first signal, wherein determining the SIR is further based at least in part on both of the first signal strength of the first signal and a transmit power for communicating in the second network, and wherein utilizing the duration of the first signal in computing the level of utilization of the communications medium comprises applying, based at least in part on comparing the function of the SNR and the SIR to one or more thresholds, a weight to the duration of the signal.

8. The method of claim 3, wherein determining the SNR is based at least in part on the MCS of the first signal, wherein determining the SIR is further based at least in part on all of the first signal strength of the first signal, a noise power related to the first signal, and a transmit power for communicating in the second network, and wherein utilizing the duration of the first signal in computing the level of utilization of the communications medium comprises applying, based at least in part on comparing the function of the SNR and the SIR to one or more thresholds, a weight to the duration of the signal.

9. The method of claim 3, wherein utilizing the duration of the first signal in computing the level of utilization of the communications medium comprises applying, based at least in part on comparing the second signal strength of the second signal to one or more thresholds, a weight to the duration of the signal.

10. The method of claim 1, wherein communications by the second network are based on Carrier Sense Adaptive Transmission (CSAT), the method further comprising receiving the first signal during a period in which transmission by the second network is OFF ($T_{OFF}$) in a CSAT cycle of a CSAT ON period.

11. The method of claim 1, wherein the first network is a Wi-Fi network and the second network is a Long Term Evolution (LTE) network.

12. An apparatus for reducing interference between networks, comprising:
a memory; and
at least one processor coupled to the memory, wherein the at least one processor is configured to execute:
a signal decoding component configured to decode a first signal transmitted by a first network over a communications medium using an unlicensed frequency spectrum and decode a second signal transmitted by the first network over the communications medium;
a signal parameters evaluating component configured to determine one or more parameters of a data packet in the first signal and determine that the second signal includes an acknowledgement packet associated with the data packet;
a medium utilization estimating component configured to:
determine a signal-to-noise ratio (SNR) associated with a first signal strength of the first signal;
determine, based on determining that the second signal includes the acknowledgement packet associated with the data packet, a signal-to-interference ratio (SIR) as a function of at least a second signal strength of the second signal; and
utilize, based on determining that the second signal includes the acknowledgement packet associated with the data packet and where a function including both of the SNR and the SIR achieves a threshold, a duration of the first signal in computing a level of utilization of the communications medium by the first network;
a communication time adjusting component configured to adjust a time for communicating in a second network over the communications medium using the unlicensed frequency spectrum based at least in part on the level of utilization of the communications medium by the first network; and
a communication device configured to communicate, based on the time as adjusted, in the second network by transmitting over the communications medium using the unlicensed frequency spectrum.

13. The apparatus of claim 12, wherein the signal decoding component is configured to decode the first signal based at least in part on determining the first signal strength of the first signal is at least at a threshold level.

14. The apparatus of claim 12, wherein the one or more parameters include one or more of the duration of the first signal, a modulation and coding scheme (MCS) of the first signal, or a type of the data packet.

15. The apparatus of claim 14, wherein the medium utilization estimating component is configured to:
determine the SNR based at least in part on the MCS of the first signal; and
determine the SIR further based at least in part on both of the first signal strength of the first signal and a transmit power for communicating in the second network.

16. The apparatus of claim 14, wherein the medium utilization estimating component is configured to:
determine the SNR based at least in part on the MCS of the first signal; and
determine the SIR further based at least in part on all of the first signal strength of the first signal, a noise power related to the first signal, and a transmit power for communicating in the second network.

17. The apparatus of claim 14, wherein the medium utilization estimating component is configured to utilize the duration of the first signal in computing the level of utilization of the communications medium based on comparing the second signal strength to a threshold.

18. The apparatus of claim 14, wherein the medium utilization estimating component is configured to:
determine the SNR based at least in part on the MCS of the first signal;
determine the SIR based at least in part on both of the first signal strength of the first signal and a transmit power for communicating in the second network; and
apply, based at least in part on comparing the function of the SNR and the SIR to one or more thresholds, a weight to the duration of the signal in computing the level of utilization of the communications medium by the first network.

19. The apparatus of claim 14, wherein the medium utilization estimating component is configured to:
    determine the SNR based at least in part on the MCS of the first signal;
    determine the SIR based at least in part on all of the first signal strength of the first signal, a noise power related to the first signal, and a transmit power for communicating in the second network; and
    apply, based at least in part on comparing the function of the SNR and the SIR to one or more thresholds, a weight to the duration of the signal in computing the level of utilization of the communications medium by the first network.

20. The apparatus of claim 14, wherein the medium utilization estimating component is further configured to apply, based at least in part on comparing the second signal strength to one or more thresholds, a weight to the duration of the signal in computing the level of utilization of the communications medium by the first network.

21. The apparatus of claim 12, wherein communications by the second network are based on Carrier Sense Adaptive Transmission (CSAT), the method further comprising a signal receiving component configured to receive the first signal during a period in which transmission by the second network is OFF ($T_{OFF}$) in a CSAT cycle of a CSAT ON period.

22. The apparatus of claim 12, wherein the first network is a Wi-Fi network and the second network is a Long Term Evolution (LTE) network.

23. An apparatus for reducing interference between networks, comprising:
    means for decoding a first signal transmitted by a first network over a communications medium using an unlicensed frequency spectrum and decoding a second signal transmitted by the first network over the communications medium;
    means for determining one or more parameters of a data packet in the first signal and determining that the second signal includes an acknowledgement packet associated with the data packet;
    means for determining a signal-to-noise ratio (SNR) associated with a first signal strength of the first signal;
    means for determining, based on determining that the second signal includes the acknowledgement packet associated with the data packet, a signal-to-interference ratio (SIR) as a function of at least a second signal strength of the second signal;
    means for utilizing, based on determining that the second signal includes the acknowledgement packet associated with the data packet and where a function including both of the SNR and the SIR achieves a threshold, a duration of the first signal in computing a level of utilization of the communications medium by the first network;
    means for adjusting a time for communicating in a second network over the communications medium using the unlicensed frequency spectrum based at least in part on the level of utilization of the communications medium by the first network; and
    means for communicating, based on the time as adjusted, in the second network by transmitting over the communications medium using the unlicensed frequency spectrum.

24. The apparatus of claim 23, wherein the one or more parameters include one or more of the duration of the first signal, a modulation and coding scheme (MCS) of the first signal, or a type of the data packet.

25. The apparatus of claim 24, wherein the means for determining the SNR determines the SNR based at least in part on the MCS of the first signal, and wherein the means for determining the SIR determines the SIR based at least in part on both of the first signal strength of the first signal and a transmit power for communicating in the second network.

26. The apparatus of claim 24, wherein the means for determining the SNR determines the SNR based at least in part on the MCS of the first signal, and wherein the means for determining the SIR determines the SIR based at least in part on all of the first signal strength of the first signal, a noise power related to the first signal, and a transmit power for communicating in the second network.

27. A non-transitory computer-readable storage medium storing computer executable code that, when executed by a processor, causes the processor to:
    decode a first signal transmitted by a first network over a communications medium using an unlicensed frequency spectrum;
    decode a second signal transmitted by the first network over the communications medium;
    determine one or more parameters of a data packet in the first signal;
    determine that the second signal includes an acknowledgement packet associated with the data packet;
    determine a signal-to-noise ratio (SNR) associated with a first signal strength of the first signal;
    determine, based on determining that the second signal includes the acknowledgement packet associated with the data packet, a signal-to-interference ratio (SIR) as a function of at least a second signal strength of the second signal;
    utilize, based on determining that the second signal includes the acknowledgement packet associated with the data packet and where a function including both of the SNR and the SIR achieves a threshold, a duration of the first signal in computing a level of utilization of the communications medium by the first network;
    adjust a time for communicating in a second network over the communications medium using the unlicensed frequency spectrum based at least in part on the level of utilization of the communications medium by the first network; and
    communicate, based on the time as adjusted, in the second network by transmitting over the communications medium using the unlicensed frequency spectrum.

28. The non-transitory computer-readable storage medium of claim 27, wherein the one or more parameters include one or more of the duration of the first signal, a modulation and coding scheme (MCS) of the first signal, or a type of the data packet.

29. The non-transitory computer-readable storage medium of claim 28, wherein the code, when executed by the processor, causes the processor to:
    determine the SNR based at least in part on the MCS of the first signal; and
    determine the SIR based at least in part on both of the first signal strength of the first signal and a transmit power for communicating in the second network.

30. The non-transitory computer-readable storage medium of claim 28, wherein the code, when executed by the processor, causes the processor to:

determine the SNR based at least in part on the MCS of the first signal; and determine the SIR based at least in part on all of the first signal strength of the first signal, a noise power related to the first signal, and a transmit power for communicating in the second network.

* * * * *